(12) United States Patent
Westerdahl et al.

(10) Patent No.: US 11,733,418 B2
(45) Date of Patent: Aug. 22, 2023

(54) P/S WAVE MEASUREMENT AND COMPENSATION

(71) Applicant: STATOIL PETROLEUM AS, Stavanger (NO)

(72) Inventors: Harald Westerdahl, Dal (NO); Mark Thompson, Trondheim (NO); Lasse Amundsen, Trondheim (NO)

(73) Assignee: STATOIL PETROLEUM AS, Stavanger (NO)

( * ) Notice: Subject to any disclaimer, the term of this patent is extended or adjusted under 35 U.S.C. 154(b) by 912 days.

(21) Appl. No.: 16/393,681

(22) Filed: Apr. 24, 2019

(65) Prior Publication Data
US 2019/0250297 A1    Aug. 15, 2019

Related U.S. Application Data

(62) Division of application No. 15/309,043, filed as application No. PCT/EP2015/059962 on May 6, 2015, now Pat. No. 10,365,388.

(30) Foreign Application Priority Data

May 7, 2014    (GB) .................................... 1408083

(51) Int. Cl.
  *G01V 1/38*   (2006.01)
  *G01V 1/36*   (2006.01)
(52) U.S. Cl.
  CPC ............... *G01V 1/364* (2013.01); *G01V 1/38* (2013.01); *G01V 2210/1293* (2013.01); *G01V 2210/1427* (2013.01); *G01V 2210/324* (2013.01)

(58) Field of Classification Search
  CPC .. G01V 1/364; G01V 1/38; G01V 2210/1293; G01V 2210/1427; G01V 2210/324
  See application file for complete search history.

(56) References Cited

U.S. PATENT DOCUMENTS 2,927,300 A     3/1960   Smith
7,433,265 B2   10/2008   Craft et al.
                (Continued)

FOREIGN PATENT DOCUMENTS

CA    2928893 A1 *  5/2014   ............ E21B 43/00
GB    2 423 362 A     8/2006
                (Continued)

OTHER PUBLICATIONS

Amundsen et al., "Decomposition of multicomponent sea-floor data info upgoing and downgoing P- and S-waves", Geophysics, vol. 60, No. 2, Mar.-Apr. 1995, pp. 563-572.
(Continued)

*Primary Examiner* — Krystine E Breier
(74) *Attorney, Agent, or Firm* — Birch, Stewart, Kolasch & Birch, LLP

(57) ABSTRACT

A method for use in surveying a subsurface region beneath a body of water by detecting compressional, P, waves propagating through the body of water includes locating one or more sensor systems in the water at or close to the subsurface region, using the or each sensor system to detect P waves in the water, and translating all or a portion of the data representing the detected P waves to a higher level above the subsurface region. In the method, the effects of S waves, propagating in the subsurface and converted at the water/subsurface interface into P waves propagating in the water or along the seabed interface, in the translated data is reduced.

22 Claims, 28 Drawing Sheets

(56) References Cited

U.S. PATENT DOCUMENTS

| | | | |
|---|---|---|---|
| 7,791,980 B2* | 9/2010 | Robertsson | G01V 1/3808 367/24 |
| 8,077,543 B2* | 12/2011 | van Manen | G01V 1/38 367/24 |
| 9,081,111 B2 | 7/2015 | Amundsen et al. | |
| 2010/0177595 A1* | 7/2010 | Khare | G01V 1/28 367/73 |
| 2013/0088939 A1 | 4/2013 | Edme | |
| 2013/0163374 A1 | 6/2013 | Herrmann | |
| 2017/0075014 A1 | 3/2017 | Westerdahl et al. | |
| 2019/0101659 A1* | 4/2019 | Ravasi | G01V 1/308 |

FOREIGN PATENT DOCUMENTS

| | | |
|---|---|---|
| GB | 2 426 051 A | 11/2006 |
| GB | 2479200 A | 10/2011 |
| WO | WO 03/069635 A2 | 8/2003 |
| WO | WO 2011/121128 A2 | 10/2011 |
| WO | WO 2013/122659 A1 | 8/2013 |

OTHER PUBLICATIONS

Amundsen et al., "Wavefield decomposition of seabed node marine recordings", SEG Houston 2013 Annual Meeting, 2013, pp. 146-150.

\* cited by examiner

P/S WAVE MEASUREMENT AND COMPENSATION

CROSS-REFERENCE TO RELATED APPLICATIONS

This application is a Divisional of U.S. patent application Ser. No. 15/309,043, filed on Nov. 4, 2016, which was filed as the National Phase of PCT International Application No. PCT/EP2015/059962, filed on May 6, 2015, which claims the benefit of priority of British Application No. 1408083.2, filed on May 7, 2014, all of which are hereby expressly incorporated by reference into the present application.

TECHNICAL FIELD

The present invention relates to a method, apparatus and system for measuring and compensating P and S waves associated with surveying operations such as, for example, marine surveys conducted to identify and/or monitor hydrocarbon reservoirs.

BACKGROUND

In the context of marine seismic surveys, two types of seismic waves are of interest, namely P waves and S waves. P waves, or Primary waves, are compressional waves that are longitudinal in nature. These are pressure waves that can travel through any type of material including fluids. S waves, or Secondary waves, are shear waves that are transverse in nature and cannot travel any distance through fluids. They travel more slowly through solid materials than P waves, hence the name ("Secondary"). As S waves cannot travel through fluids, they can only truly be detected by receivers that are mechanically coupled to the seabed. Sophisticated processing techniques have been developed to make use of detected S and P waves to image subsea regions and in particular to detect and monitor hydrocarbon bearing formations.

Whilst, traditionally, P waves have been detected using arrays of sources and receivers towed in the water, both P and S waves can be monitored by measuring two physical effects at the seabed, namely pressure and particle velocity or particle acceleration. These measured physical effects are analysed using complex algorithms in order to detect and separate the P and S waves. Traditionally, seismic surveys have been conducted using arrays of so-called 4c sensors, each of which monitors four components, namely pressure and three orthogonal components of particle velocity (x, y and z), using a single hydrophone and three orthogonally-oriented geophones.

More recently, it has been appreciated that additional data—including pressure derivatives in the horizontal plane (x and y directions) and the particle velocity derivatives in the horizontal plane (x and y directions)—can prove valuable in monitoring the P and S waves, resulting in higher quality (e.g. higher resolution) data. [The terms "gradients" and "derivatives are used interchangeably in the technical literature.]

It is noted that the horizontal particle velocity (in the water column) can be, and in practise normally is, derived from the horizontal pressure gradient measured at the seabed. Furthermore, the horizontal particle velocity's horizontal gradient can be derived from the derivative of the pressure gradients, that is the second order horizontal pressure gradient, and so forth.

To obtain additional data to improve the quality of the P-wave field, so-called 6c sensors are employed to measure six components, namely; pressure (p) and its first order spatial derivatives in the horizontal plane (dp/dx, dp/dy), and vertical particle velocity (Vz) and its spatial derivatives in the horizontal plane (dVz/dx,dVz/dy). In some cases, even more complex sensors may be used, e.g. 10c sensors to collect the 6c data plus four second order derivatives. These sensors do not necessarily need to be at the seabed, but could in principle be positioned anywhere in the water column. However, in order to measure S-waves, seabed coupled horizontal geophones or accelerometers are needed. These sensors are included as two of the components in traditional "4C seismic seabed recorders". Here the four components (4C) are: Pressure, vertical particle velocity and the two orthogonal horizontal particle velocity sensors. When 6C and/or 10C sensors are combined or integrated with one or more seabed coupled 4C sensors, additional data is then available for improving the data quality of both S-wave and P-wave data.

FIG. 1 illustrates schematically two possible 6c sensor configurations. On the left is shown a configuration comprising 3×2c sensors, each comprising a hydrophone and a vertically oriented geophone. On the right is shown a configuration comprising 6×P sensors, each comprising a single hydrophone (NB. it is known that vertical particle velocity can be measured by making two separate vertically spaced pressure measurements).

A number of texts cover the principles of acquisition of marine seismic data (e.g., Sheriff and Geldart, 1995; Ikelle and Amundsen, 2005). There are several configurations of source and receiver distributions; those commonly used for petroleum exploration are (1) towed-streamer acquisition, where sources and receivers are distributed horizontally in the water column near the sea surface; (2) ocean-bottom seismic (OBS) acquisition, where the sources are towed in the water column and the receivers are on the seafloor; and (3) vertical-cable (VC) acquisition, where the sources are towed near the sea surface as in towed-streamer and OBS acquisition but the receivers are distributed in the water in a vertical array.

A particular case of the OBS acquisition involves the use of Ocean Bottom Nodes (OBNs), rather than the more conventional ocean bottom cables. OBNs are typically battery powered, cableless receivers placed in deep water. OBNs can be relatively easy to deploy and remove, and are especially suited for use in relatively congested waters where the deployment of streamers and ocean bottom cables is difficult. OBNs are typically deployed and recovered by Remote Operated Vessels (ROVs), using free fall systems and acoustic release to facilitate recovery, or using "nodes on rope" techniques where multiple nodes are attached to a rope with an acoustic release buoy at the end. These approaches are traditionally used to detect data that consists of both P and S waves. It should also be noted that there are significant advantages to collecting data (P waves) at or close to the seabed where recording conditions are quiet, being shielded from sea currents, and where conditions are good for low frequency data recorded by particle velocity sensors or accelerometers.

WO2011/121128 describes a method of providing seismic data (such as marine seismic data). A seismic source is actuated at a plurality of source locations. For each source location, a multicomponent seismic measurement is performed at at least one receiver location. A reconstructing method is applied to each multicomponent measurement to obtain additional data corresponding to source locations additional to the source locations at which the source was actuated. The additional data are output and/or used. WO2011/121128 proposes, by way of example, that this approach may be used in the context of OBN/OBS acquisition, i.e. where multicomponent (6c) receiver nodes are located on the seabed and the sources are towed in the water column by a surveying vessel.

Commercial Oil and gas discoveries are typically found in sedimentary structures defined as "traps", where porous rocks are covered by tight cap rocks. The structures are visible on seismic images due to variations in elastic properties of the rocks. P and S wave derived images may have different expressions, because their response is determined by different elastic properties (shear stiffness and normal stiffness) and may produce images that can be both supplementary and/or complementary. For example, S waves may more easily "see through" overburden sediments containing gas, whereas P waves may be completely attenuated. Furthermore, S waves may be more responsive to fluid overpressure and associated Geohazards. On the other hand, P waves are more sensitive to fluid type (distinguish gas, oil, water) than are S waves. Using the combination of P and S wave responses, one can improve the overall geological and geophysical interpretation of the data, providing a more accurate estimate of location, size and volume (and pressure) prediction, and type of fluids presents in the reservoirs.

In order to produce high quality S and P images of the subsurface, advanced data processing of the recorded data is needed in order to filter out noise and "beam-form" or migrate the seismic energy to the right location (to the image point). Traditionally P and S data are imaged separately, and one assumes (requires) that the P-wave data set is free of S waves (also free of S to P converted data) and the S-wave data set is free of P waves. This may not be the case in practice, and therefore the results may be compromised.

Traditionally, the seismic industry relies upon processing/ imaging steps to try to "wash out" and suppress any P wave/S wave crosstalk interference. Clearly, reducing the levels of noise in the input S and P wave data would improve the final image/or inversion results (for a given amount of effort/data size input and set of processing steps). Cleaner S and P input data, also would make processing/imaging/ inversion using the wave equation more efficient, because a coupled solution (using full elastic formulation) may be split into separate processes, and run more efficiently with simpler formulations (for example scalar formulations).

A problem encountered with OBS systems is the interference that occurs between the two types of waves. For example, a detector mechanically coupled to the seabed and configured to detect S waves will pick up the effects of P waves propagating in the seabed. Although it may be possible to remove much of the effects of the early P waves by filtering based upon arrival time (P waves propagate faster through the subsea formation than do S waves) and apparent speed, not all of the effects can be removed, due to later P arrivals, for example as a result of reflections from different interfaces, ringing in the source signal, and overlapping P and S energy in time due for example to P-S conversion and reflections at or close to the seabed. Conversely, a detector located in the water just above the subsea surface and configured to detect the effects of P waves may be influenced by S waves. Although S waves do not propagate through the water, there will be some conversion of S waves and surface waves/interface waves (Scholte wave; S-wave travelling along the seabed) to P waves at the seabed. It is desirable to remove the effects of such converted S waves from the data collected by the P wave detector and remove the effects of P-waves on the S-detector.

SUMMARY

There is proposed a method to enhance data quality and separate and interpolate elastic wavefields from seismic measurements of pressure and spatial derivatives of pressure (and/or quantities derived thereof) and seabed displacement, (and/or quantities derived thereof, eg. time derivatives velocity or acceleration) and its spatial derivatives.

According to a first aspect of the present invention there is provided a method for use in surveying a subsurface region beneath a body of water by detecting S waves propagating through the subsurface region. The method comprises using a first sensor configuration to detect mixed S and P waves on or in the subsurface region, using a second sensor configuration located on or in relatively close proximity to the subsurface region to detect P waves in the water, and using the P waves detected in the water to compensate the detected mixed S and P waves, and thereby attenuate the effects of P waves in the mixed S and P waves.

Preferably, the first and second sensor configurations may detect wavefield components comprising one or more of mutually orthogonal particle velocities (Vx, Vy, Vz) or particle accelerations. A sensor configuration may detect a particle velocity or particle acceleration using two or more closely spaced hydrophones.

The step of compensating may comprise scaling a component detected by the second sensor configuration to obtain a scaled component, and subtracting the scaled component from a corresponding component detected by the first sensor configuration. The compensation may be applied to wavefield components comprising horizontal particle velocity (Vx and/or Vy) or horizontal particle acceleration. A component may be scaled using a scaling factor corresponding to a water to subsurface density ratio (density1/density2).

The first sensor configuration may comprise a plurality of geophones in mechanical contact with the subsurface and said second sensor configuration comprises a plurality of hydrophones on the seabed or suspended in the water and, optionally geophones or accelerometers, suspended in the water.

One or both of said first and second sensors may be in mechanical contact with the seabed.

According to a second aspect of the present invention there is provided method for use in surveying a subsurface region beneath a body of water by detecting P waves propagating through the body of water. The method comprises using the method of the above first aspect of the invention to detect S waves propagating through the subsurface region, compensated in order to attenuate the effects of P waves and applying the compensated S wave to the P waves detected in the water in order to compensate interaction with the former and thereby attenuate the effects of S waves propagating in the subsurface and converted at the water/subsurface interface into P waves propagating in the water or along the seabed.

The step of applying the compensated S wave to the P waves detected in the water may comprise applying the compensated S wave to the particle velocity Vz, particle acceleration, and/or displacement in the vertical direction. More particularly, the step of applying the compensated S wave to the particle velocity Vz in the vertical direction comprises determining a relationship between the vertical particle velocity and a particle velocity, acceleration, and/or displacement in the horizontal direction, applying that relationship to the compensated S wave data, and subtracting the result from the P wave data.

The step of applying the compensated S wave to the P waves detected in the water may comprise determining parameters of a digital filtering using the S wave data, and applying the digital filter to the P wave data.

According to a third aspect of the present invention there is provided method for use in surveying a subsurface region beneath a body of water by detecting compressional, P, waves propagating through the body of water. The method comprises locating one or more sensor systems in the water at or close to the subsurface region, using the or each sensor system to detect P waves in the water, and translating all or a portion of the data representing the detected P waves to a higher level above the subsurface region. This results in the effects of S waves, propagating in the subsurface and converted at the water/subsurface interface into P waves propagating in the water or along the seabed interface, in the translated data being reduced.

Said higher level may between 1 and 50 meters, preferably 1 to 20 meters, above the level of the sensor system(s).

The higher level may between one tenth to two apparent horizontal wavelength of the recorded S-wave on the seabed.

The sensor system may be in mechanical contact with the seabed.

Said data may comprise one or more of pressure, pressure gradients, vertical particle velocity (Vz), horizontal particle velocity (Vx and/or Vy), vertical particle acceleration, and horizontal particle acceleration. A data component at a higher level may be obtained using a corresponding component, detected at or close to the subsurface region by said sensor system, and a first order derivative of that detected component. A data component at a higher level may be obtained additionally using one or more higher order derivatives of the detected component. Said data component at a higher level may be obtained by applying a Taylor series expansion using a finite and selected number of terms in said expansion.

According to a fourth aspect of the present invention there is provided method for use in surveying a subsurface region beneath a body of water by detecting compressional, P, waves propagating through the body of water. The method comprises locating one or more sensor systems in the water at or close to the subsurface region, using the or each sensor system to detect P wave data in the water, including at least pressure and pressure gradients or components derived therefrom, translating the P wave data using a combination of pressure, a second order time derivative of pressure, vertical pressure gradient, and second order horizontal pressure gradient or components derived therefrom, and taking spatial derivatives of the translated P wave data to determine particle acceleration or particle velocity data. This results in the effects of S waves, propagating in the subsurface and converted at the water/subsurface interface into P waves propagating in the water or along the seabed interface, in the determined particle acceleration data being reduced.

According to a fifth aspect of the present invention there is provided method for use in surveying a subsurface region beneath a body of water by detecting compressional, P, waves propagating through the body of water. The method comprises locating one or more sensor systems in the water at or close to the subsurface region, using the or each sensor system to detect P wave data in the water, including at least pressure and the horizontal pressure gradient, or the horizontal particle velocity or acceleration and the horizontal gradient of the vertical particle velocity or acceleration, and translating the horizontal particle velocity or acceleration of the P wave data using a combination of the horizontal particle velocity (or acceleration) and the horizontal derivatives of the vertical particle velocity or acceleration. This results in the effects of S waves, propagating in the subsurface and converted at the water/subsurface interface into P waves propagating in the water or along the seabed interface, in the translated horizontal particle velocity or acceleration being reduced.

According to a sixth aspect of the present invention there is provided method for use in surveying a subsurface region beneath a body of water by detecting compressional, P, waves propagating through the body of water. The method comprises locating one or more sensor systems in the water at or close to the subsurface region, using the or each sensor system to detect P wave data in the water, including at least pressure and pressure gradients or components derived thereof, and translating the vertical particle velocity or acceleration of the P wave data using a combination of the vertical particle velocity or acceleration, the time derivative of pressure, and the horizontal derivative of either the horizontal particle velocity or acceleration or the vertical particle velocity or acceleration, including possible phase corrections. This results in the effects of S waves, propagating in the subsurface and converted at the water/subsurface interface into P waves propagating in the water or along the seabed interface, in the translated vertical particle velocity or acceleration being reduced.

According to a seventh aspect of the present invention there is provided method of mapping or imaging a subsurface region beneath a body of water. The method comprises detecting S and or P waves according to any one of the above aspects of the invention, and using the resulting data to create a map or image of the subsurface region.

DETAILED DESCRIPTION

S Wave Data Cleaning

Figure 1:
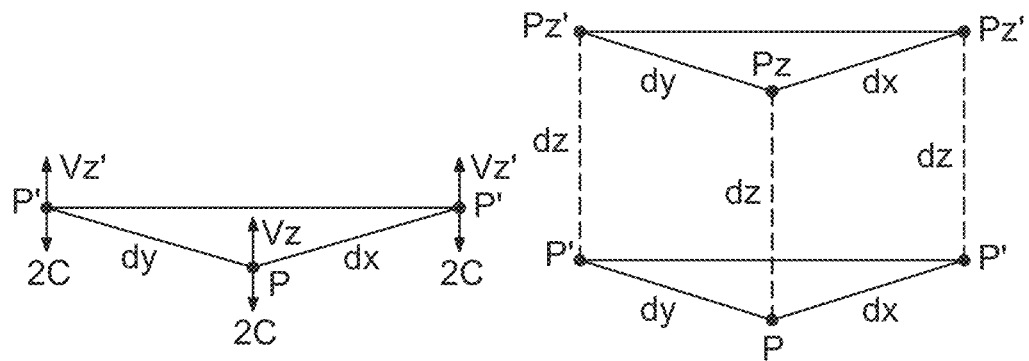
FIG. 1 illustrates schematically two possible 6c sensor configurations.
Figure 2:
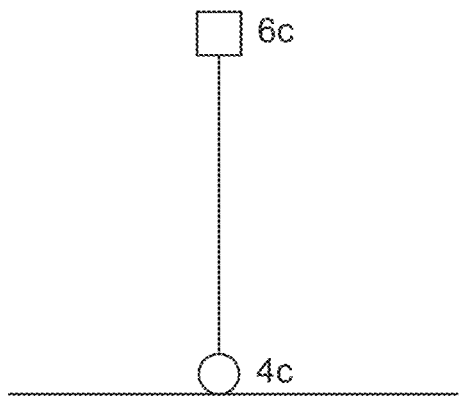
FIG. 2 illustrates an exemplary sensor system.

It will be appreciated from the discussion presented above that the use of Ocean Bottom Nodes (OBNs) in marine seismic surveys is very desirable as it allows both S and P wave data to be collected. In order to allow 6c P and S wave data to be detected, a sensor system as illustrated in FIG. 2 may be used. The sensor is located on the seabed and comprises a 4c sensor in mechanical contact with the seabed, and a 6c sensor floating in the water just above the seabed. The 6c sensor may have the configuration of either system shown in FIG. 1, or may have any other suitable configuration. It is able to monitor, inter alia, pressure (P)—e.g. by averaging multiple pressure measurements to obtain a pressure at the centre of the sensor, spatial pressure gradients, and vertical particle velocity in three orthogonal directions ((Vx, Vy and Vz). As the 6c sensor is floating in the water, detected effects are due to the presence of P waves.

The 4c sensor monitors four components, namely pressure (P) and three orthogonal components of particle velocity (Vx, Vy and Vz), using a single hydrophone and three orthogonally-oriented geophones. As this sensor is on the seabed, it detects effects due to the presence of P and S waves. [In the art, and elsewhere in this document, particle velocity in the seabed (and measured by the 4c sensor) is referred to as the "elastic" particle velocity, whilst that in the water (and measured by the 6c sensor) is referred to as the "acoustic" particle velocity.]

It is recognized here that, through the combination of 6c acoustic measurements (P wave, and P wave gradients) on or near the sea bed, and traditional 4c measurements on the seabed (P and S wave), one can improve the data quality of both P and S measurements through improved calibration and signal enhancement, improved P and S wavefield separation, and the removal of "crosstalk" between the wavefields. For example, data quality improvement (separation, quality, calibration and rotation) may be achieved by calculating the horizontal particle velocity in the water directly above the seabed from 6c data (which in the main sense only P waves), perform simple or advanced scaling and/or conditioning and subsequently subtracting this from the horizontal particle velocity measured using geophones on the seabed (comprising both P and S wavefield contributions). In this way it will be possible to calculate something approximating pure S waves. At a "normal sedimentary seabed", the P-wave velocity is considerably higher than the S-wave velocity (more than three to four times higher), so the scaling can be very simple just a constant, determined by the density ratio of the seabed sediment and the water, if lateral variations in elastic properties of the seabed are absent or small. In such conditions, the approximation has shown by numerical modelling to be very good.

It is proposed to employ a processing method to reduce P-wave influence on the horizontal vector components (of displacement or velocity or acceleration) at the seabed, thereby obtaining a cleaner record of the S wavefield and potentially its horizontal gradients (of displacement or velocity or acceleration). The cleaned data may be further used in wavefield interpolation (in between receivers and/or in between shots) or used directly in PS imaging, that is imaging of converted waves (from P at the source to the reflector and S from the reflector to the receiver) using, for example, wave equation techniques such as reverse time migration (RTM) to enhance the S-wave image and or used directly in full waveform inversion (FWI) to improve mapping of the S-wave properties of the subsurface.

The P-waves and its components measured in the water column, or derived from multicomponent measurements at the seabed, may also be cleaned to remove the effects of S to P converted waves at the seabed by exploiting the data sets including gradients. This may be done either be exploiting the fact that a "pure S-wave dataset" can be derived as described above, and then can be used in a digital filtering process where the structure of the S-data is used as reference structure for what should be filtered out in the P-data set.

It should be noted that seismic imaging using RTM and full waveform inversion (FWI) of seismic data are merging, and use the recorded data to find the sub-surface model of elastic properties (one or more of the following: shear velocity, P-wave velocity, density, attenuation) that best matches the acquired data. The work flow is often iterative in nature: Guess a model, perform forward finite difference modelling, compare modelling results with measured data, use the error/error gradients to change the model at a given location (found from injecting the error wavefield back into the model), and repeat until the errors are within certain acceptance criteria. The process is very computer intensive and, in order to limit the computational effort, only acoustic models (acoustic wave equation applies: P-waves and no mode conversion) are considered. The acoustic models/ acoustic waves equation is scalar, and can be solved much faster than the full elastic wave equation.

Clearly, the brute force use of the multicomponent data would be to include all data at the same time in full wave form inversion and/or imaging, using a full elastic formulation for the forward and backward modelling, allowing both P-waves, S-waves and converted waves at the same time. This type of inversion and imaging would be very difficult and would require a huge computational effort. Whilst a time will probably come when computing power is strong enough for such an exercise, for the time being the most efficient way of solving the inversion/imaging task is by splitting it in two schemes, P and S (includes PS, SS) data sets, and combine the results at the end or during inversion/ model updates. An important requirement for such a strategy is that the receiver data input is clean P and clean S data.

An important criteria for getting good results with forward and backward finite difference (or finite element) modelling used in FWI and RTM, is that the spacing between the receiver and/or shot points is small and within the limits set by discrete sampling theory. For a single component regularly space grid, the requirement is at least two recording locations or source points within the shortest apparent wavelength observed at the shooting or recording surface. That is, to allow for wide bandwidth and high resolution, a dense grid is required. For multicomponent data, implemented with simultaneous multicomponent sources in the backward modelling part in FWI and RTM, the distances between individual receivers/sources may be larger. To improve the situation and to fill in the grid to make it denser, the additional data, or more precisely the horizontal gradients (first and eventually also higher order) of each of the individual components, may be used to calculate additional data points of the component in question in between the original locations by interpolation, using the extended sampling theorem (involving the data and the horizontal gradients of the data at grid points). To follow of idea of separating wave field, addressing P and S separately, we then would need clean components and also clean component horizontal gradients in order to do interpolation.

Considering further the exploitation of multiple field components obtained on and close to the seabed, and their derivatives, the following process may be employed:

Reduce or eliminate the effects of wavefields propagating just above the seabed (i.e. acoustic wavefield components, from the detected components of wavefields propagating in the seabed (i.e. elastic wavefield components). When the P wavefield effects are removed from the detected seabed components, a cleaner S-record can be obtained at each sensor station location. This in turn allows the horizontal spatial S wavefield gradients (dVx/dx, etc) to be calculated and used for shot and receiver point interpolation, calculating elastic wavefield data at additional locations, or used in elastic RTM back propagation to improve subsurface elastic imaging and/or inversion results.

Other processes that may be used include:

Improve sensor calibration and 3D rotation. Hydrophone derived data is typically valid down to low frequencies (about 1 Hz), while typically geophone data has non-linear reduced sensitivity below a lower frequency limit (10-15 Hz, for omnidirectional receivers). Relevant also for vector fidelity: that is, correction for varying impulse response with direction.

Obtain a subsurface model by inversion using an elastic model and all the recorded data (6C or more). Calculate Vp, Vs and rho (includes anisotropy, and damping) in the subsurface.

Analyzing components measured by, or derived from more than one sensor (for example pressure and vertical velocity) to extract a "best result" by weighted averaging or median picking.

Propose a method to improve the quality of the vertical component. Rotation improvements, or other: for example using horizontal components. One subsurface simple model should make it all consistent. One may for example calculate whether the vertical component is correct or not, and propose correction, by using the data from the other component.

Improve data quality with correct magnitude and phase calibration given from the measurements combined with relationships given by the wave equation: Curl P-gradients(or acceleration or velocity)=0 and sum of second spatial derivatives should equal the second derivative of time.

Basic formulas that could be utilized in the sensor technology:

Hydrodynamic equation (newton 2. law):

$$\frac{dv}{dt} = -\frac{1}{\rho}\nabla p$$

That is, acceleration is related to pressure gradients
Scalar wave equation pressure:

$$\nabla^2 p = \frac{1}{c^2}\frac{d^2 p}{dt^2}$$

That is, the sum of the second order special derivative relates to the second order time derivative.

Vector wave equation particle velocity $$\frac{1}{\rho}\nabla(\rho c^2 \nabla \cdot v) = \frac{d^2 v}{dt^2}$$

Non-rotational in the water: Curl a=0, curl dp=0, curl v=0;

$$\frac{dp_z}{dy} = \frac{dp_y}{dz}, \frac{dp_x}{dz} = \frac{dp_z}{dx}, \frac{dp_y}{dx} = \frac{dp_x}{dy}$$

For a plane wave propagating in the x-direction: $p=v_x\rho c$

The fact that curl=0 may be used for quality control and "sherry picking good data" but also for getting the Vx and Vy gradient in the vertical direction, from measurements of Vz only along the seabed, which is easier than measuring upwards in the water column, i.e. dVx/dz=dVz/dx, and dVy/dz=dVz/dy. Note that the component we consider here is the particle velocity in the water and not in the seabed, but the normal component (that is Vz, if the seabed is horizontal) is the same at the interface, because this component is continuous through the interface (the horizontal particle velocities Vx and Vy are not continuous).

Figure 3:
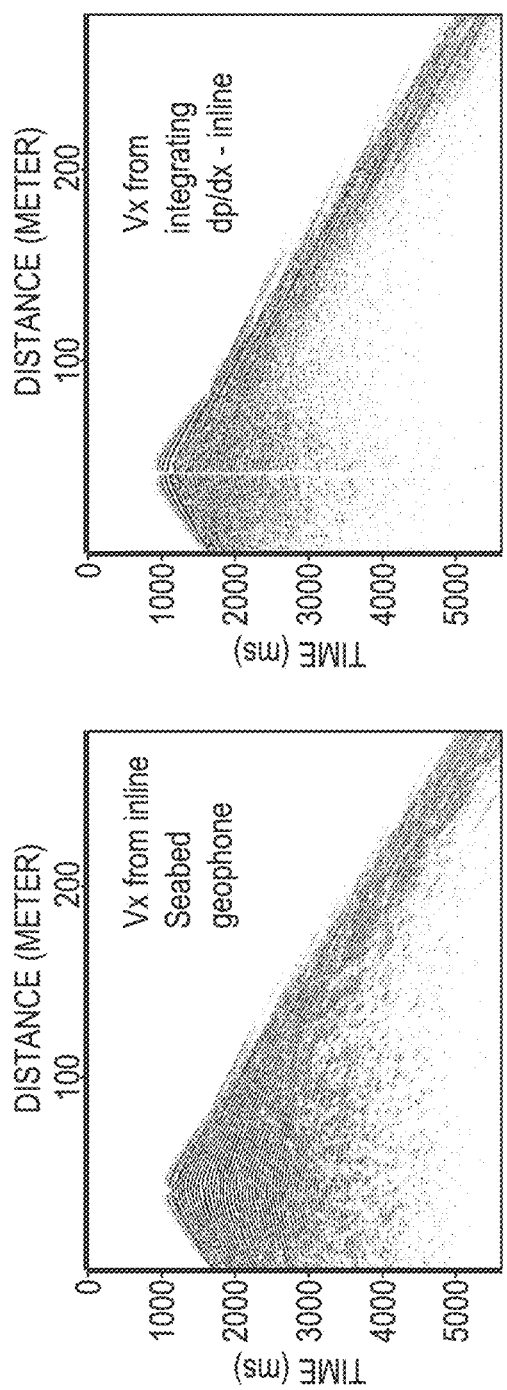
FIG. 3 illustrates data obtained from a field, test, comparing horizontal geophone with horizontal particle velocity calculated from the pressure differences.

FIG. 3 illustrates data obtained from a field test, comparing horizontal geophone with horizontal particle velocity calculated from the pressure differences (where the vertical axis represents time and the horizontal axis represents distance). The data has been filtered to retain only data between 15-200 Hz (omnidirectional 15 Hz geophone used in OBR). The left hand panel in the Figures shows time traces of horizontal particle velocity Vx measured by a geophone on the seabed which contains both P and S waves (original PP and mode converted waves PS, SPS, waves). The right hand panel in the Figures shows time traces of horizontal particle velocity Vx calculated from pressure difference (two hydrophones in the water on/close to the seabed), and therefore contains only P-waves ("original PP" and some S to P converted waves).

Considering this exemplary data (FIG. 3), and the accompanying pressure data and vertical particle velocity data (which is the same on the seabed and in the water column close to the seabed), single events can be isolated, e.g. based on stable apparent angles given from ratios between horizontal and vertical components. Properties of the seabed can then be determined (Vp, Vs and Rho), in addition to knowing or finding these also in the water layer—by inversion of the measured data, resulting in a subsurface model consistent with the measured data. From this model, a calibration factor can be obtained for use with the Vx field recorded above the interface. By multiplying that field by the scaling factor a compensation field can be obtained. In turn, the compensation field can be subtracted from the recorded Vx-data on the interface in such a way that the P-wave contribution on the seabed coupled dataset vanishes or reduces to a minimum. A similar process can be applied to the Vy data. Note that the calibration factor may also be derived directly from the data, using data sections where only P-waves appear (e.g. early arrivals from far offset shots), by an iterative process or search, such as in optimization: Different calibrations factors are tested and the one finally chosen is the one that minimizes the difference between the predicted and measured seabed data.

Prior to this exercise, sensor calibration and rotation should have been carried out correctly, using the measured data. As 6c sensors and the like are able to collect much more information than conventional sensors (both independent and redundant information), improved calibration and rotation may be performed with high accuracy. An optimal way may be to set up a basic subsurface model, based on the data, then by classic inversion optimize on the calibration and rotation, based on minimizing misfit by modelled and measured data. Model properties may also be updated simultaneously.

Figure 4A:
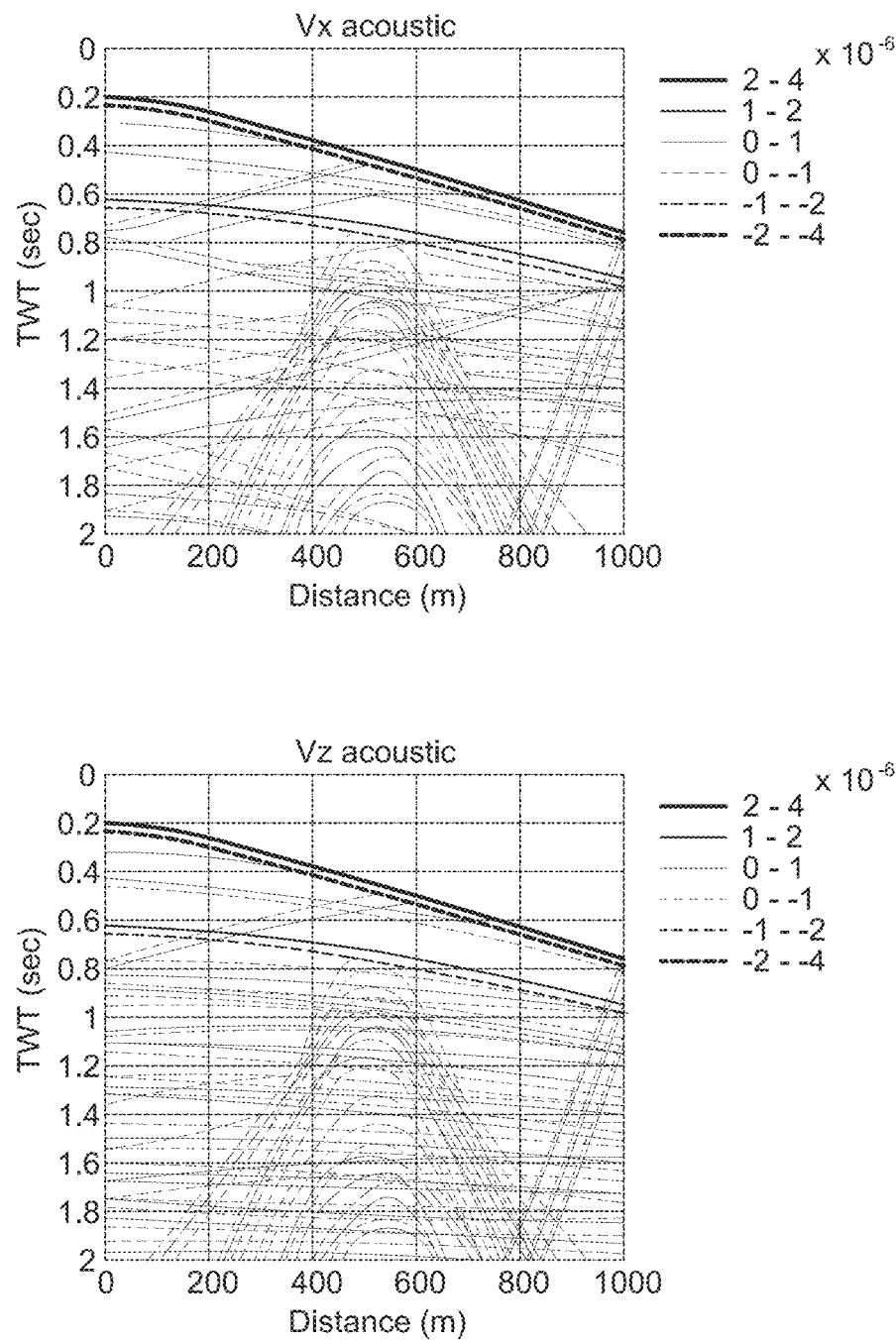
FIG. 4*a* illustrate synthetic data obtained using finite element modeling, based upon an axisymetric acoustic-elastic mode.
Figure 4A:
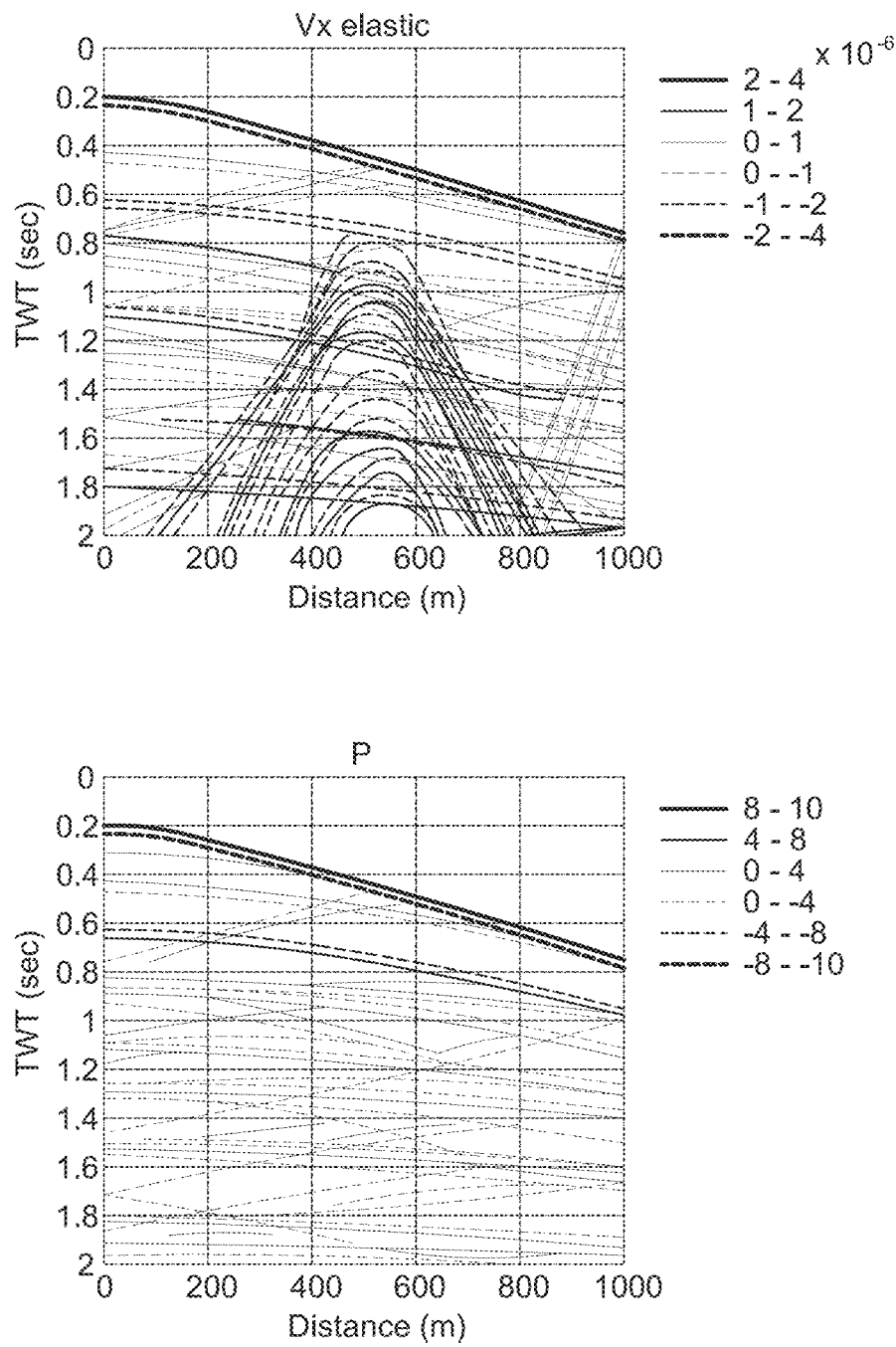
Figure 4B:
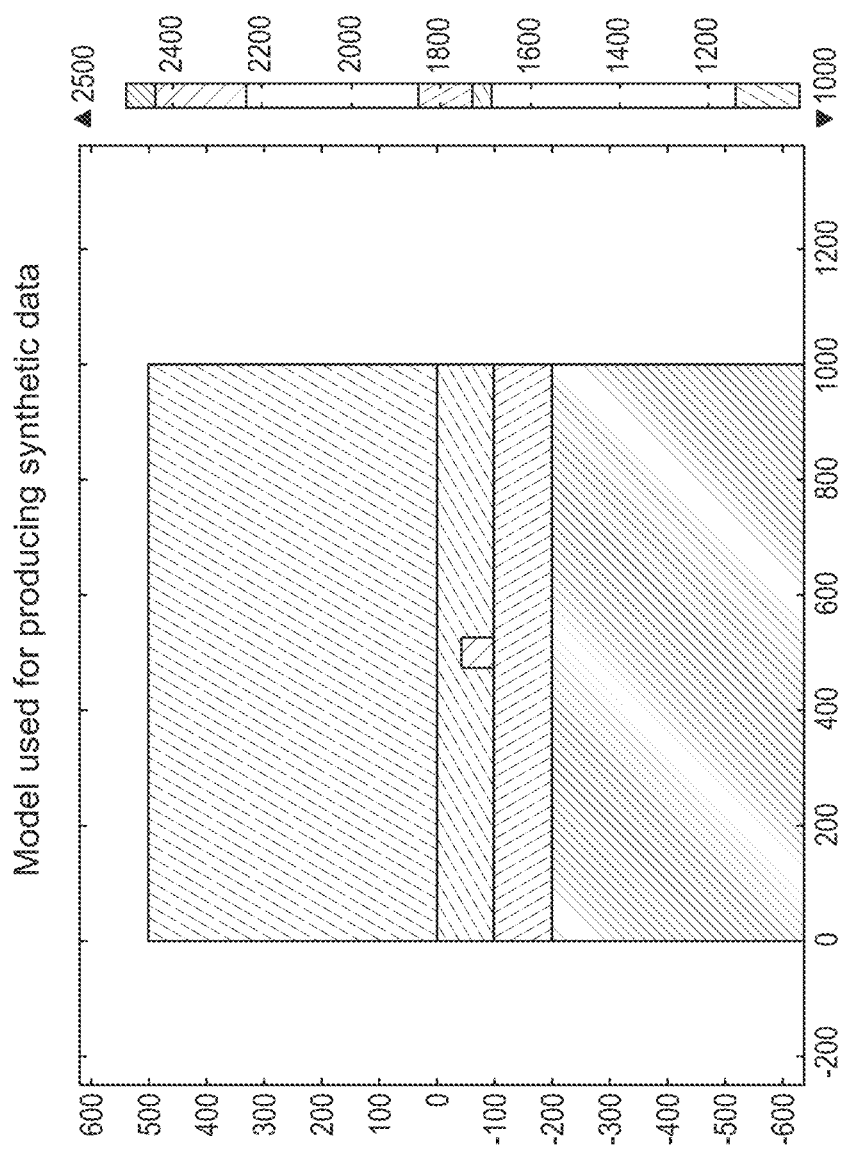
FIG. 4*b* illustrates the axisymetric acoustic-elastic mode used to obtain the plots of FIG. 4*b*.

Referring now to the plots shown in FIG. 4a, these illustrate synthetic data obtained using finite element modelling, based upon an axisymetric acoustic-elastic mode—see illustration in FIG. 4b, where:

Water layer; dens=1000 kg/m3 Vp=1500 m/s.
Sed. Layer1; Dens=1700 kg/m3, Vp=1700 m/s, Vs=200 m/s, thickn=100 m
Sed. Layer2; Dens=1800 kg/m3, Vp=1800 m/s, Vs=400 m/s, thickn=100 m
Sed. Layer3; Dens=2500 kg/m3, Vp=2500 m/s, Vs=1000 m/s, thickn=500 m
The object inside layer 1 has the same priorities as layer 3.
Free upper boundary and hard lower boundary «Low reflecting» boundaries on the sides.
Source at x=0, z=180. 15 Hz bandwidth (gaussian puls)

The plots include P=pressure at the seabed, Vx elastic=horizontal particle velocity in the seabed, Vx acoustic=horizontal particle velocity in the water, and Vz acoustic=vertical particle velocity in the water. In the plots, the vertical axis represents arrival time while the horizontal axis represents horizontal distance along the seabed. Note that Vz acoustic and Vz elastic (not shown) should be similar if the calculation is correct, because the vertical field is continous across the seabed-water interface. 'Vx acoustic' and 'Vz acoustic' are particle velocities calculated from the pressure gradients in the water just above the seabed.

Figure 5:
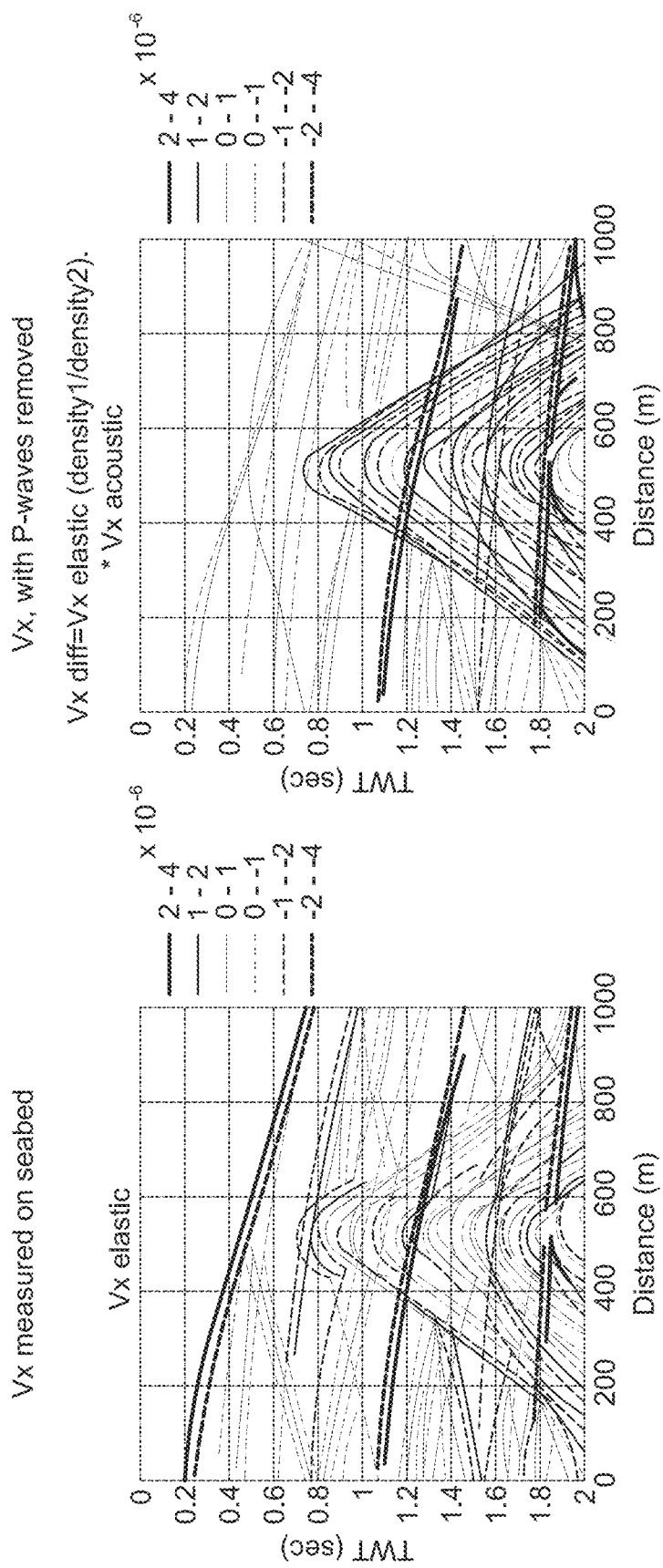
FIG. 5 illustrates (left hand trace) Vx in the seabed, that is the raw data recorded on the horizontal component at the seabed, and (right hand trace) a compensated Vx.

With reference to FIG. 5, the left hand trace again illustrates Vx in the seabed (Vx elastic, as FIG. 4), that is the raw data recorded on the horizontal component at the seabed (e.g. using the 4c sensor of FIG. 2). The earliest P-event (direct wave) is marked with an arrow, with other P and S-wave events following. It will be appreciated from the left hand panel that the strongest magnitude events picked up at the seabed are from the early P-waves. In order to clean this data, a constant scaling (density1/density2, where "density1" is the density of the water and "density2" is the density of the seabed) is applied to the Vx acoustic data (e.g. obtained using the 6c sensor of FIG. 2, again see FIG. 4), and the result subtracted from the seabed data Vx elastic. The result is the trace shown on the right hand side of FIG. 5 (Vx diff). It is clear from this compensated trace that most of the P waves are attenuated. For a normally soft sedimentary seabed, where the P wave velocity is more than say three to four times higher than the S wave velocity, it has been seen than this method will work very well and most P waves are eliminated, and the results will contain mainly up and down-going S-waves The process described above and illustrated by the traces of FIG. 5 can be repeated for the horizontal particle velocity in the y direction, i.e. Vy, where $$Vy\ \text{diff}=Vy-(\text{density1}/\text{density2})*Vy\ \text{acoustic}.$$

Figure 6:
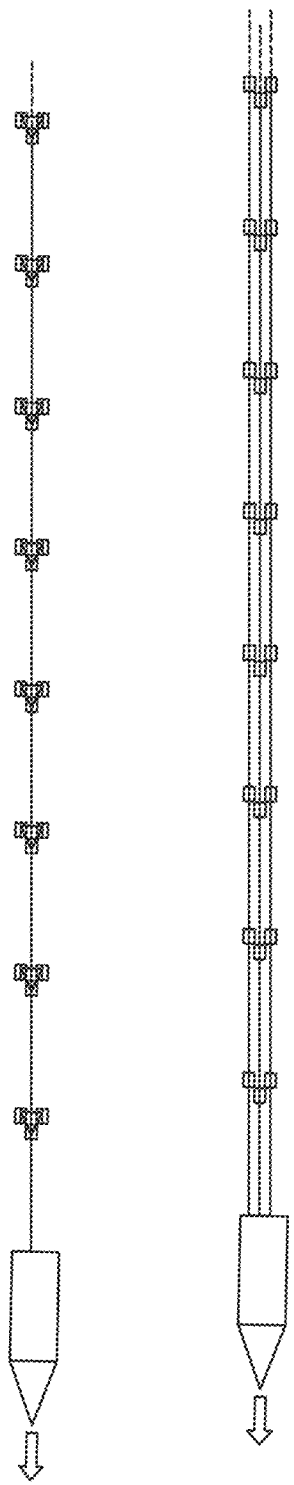
FIG. 6 illustrates two possible OBN deployment techniques.
Figure 7:
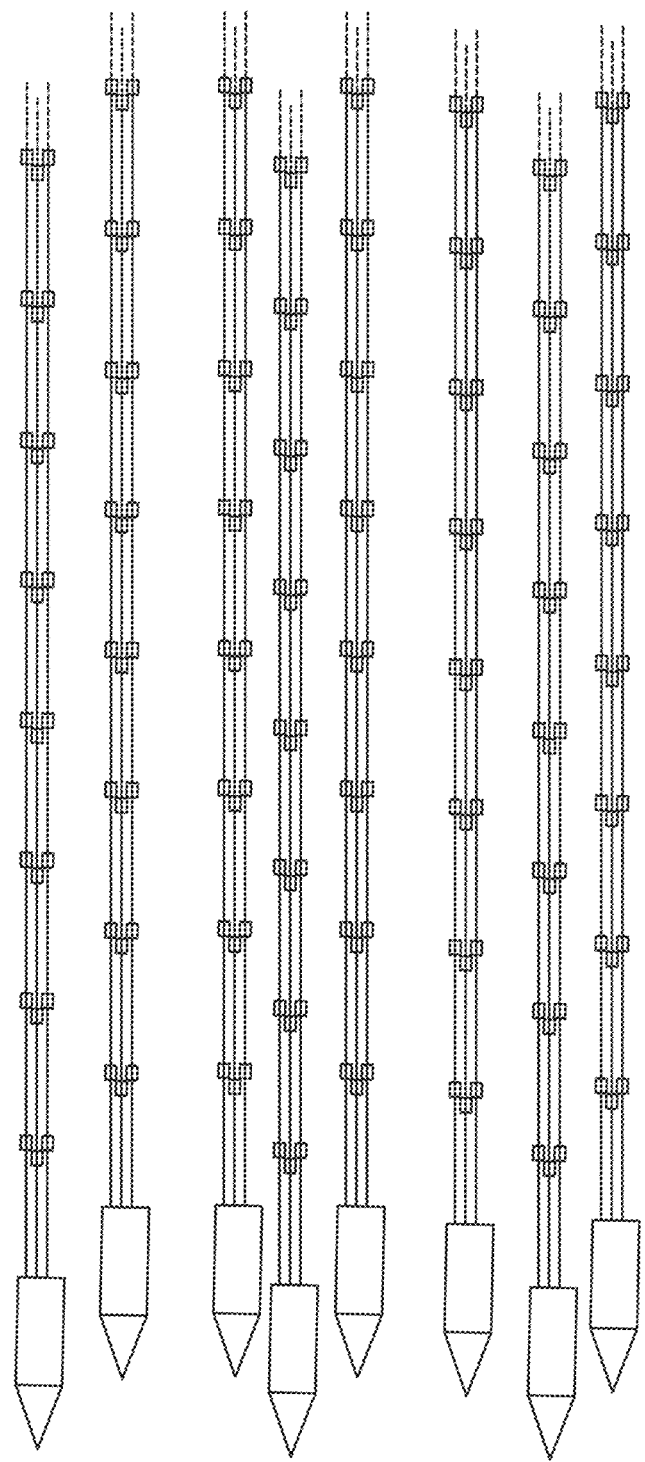
FIG. 7 illustrates an OBN deployment technique employing multiple parallel ropes.

Whilst the OBNs may be deployed using a variety of techniques, FIG. 6 illustrates two possible approaches. According to the approach illustrated at the top of the Figure, a single "rope" is deployed across the seabed, with multiple nodes in each station having a compact structure (triangle). The second approach shown in FIG. 6 involves replacing the single rope of the top approach with three or more densely spaced ropes. These ropes are laid in a single pass, with a spacing of perhaps 2-10 m. In order to provide an appropriate receiver grid, multiple parallel ropes are deployed, e.g. with a spacing of 200 m or so, as illustrated in FIG. 7.

P Wave Data Cleaning—First Approach

Having obtained a clean S data set, this provides an advantage for later use of matched or adaptive filtering to remove imprints of these S-waves on different components of P-data, because we now know the structure (shape/pattern) of the noise. Below we explain how to exploit this advantage in more details.

The most important component of the P-data that may degrade considerably in value from S-wave imprints (that is SP-conversions at the seabed) is the vertical component; that is, the particle velocity (or particle acceleration, or displacement) in the vertical direction, Vz. This is due to the particular use in subsurface imaging, where the z-component pays a crucial role in the wave field separation (up/down) processes. Below we describe a method of removing S-imprints on the Vz component, but similar processes may be employed for the pressure data and the horizontal components as well.

From the nature of acoustic and elastic waves and their interaction on the seabed (elastic theory), we know that the major contribution of the imprints on the vertical component of the particle velocity Vz (or acceleration or displacement) that originates from S-waves, is due to interface waves (Scholte waves) and/or S-waves reflected at the seabed with an angle of incidents above a certain limit producing a complex reflection coefficient. Consequently, we may exploit the pure S-wave data set of the horizontal components (that is free from P-waves) to predict the imprint of the Vz-component from the S-data set alone and/or in combination of the vertical component data set itself. Finally, we may subtract the estimated Vz imprint from the recorded Vz to remove the fraction of Vz that is caused by the S-waves. Hence, we can obtain a "cleaned" Vz-component, with reduced imprints, that is more suitable for further P-processing and P-imaging to get better and more efficient subsurface information.

A first method of predicting the Vz-imprints from the cleaned horizontal components of the S-data (recorded on the seabed) is to apply a theoretical elastic model and/or an efficient numerical elastic model, approximating the local geological conditions and modeling the response of incoming S-waves with a variety of angle of incidences. Then, from the modeled data, we may find the relationships (or functions) between the Vz imprints and the horizontal particle velocities (or acceleration or displacements) observed on the seabed, and/or selected gradients. Finally we use this function on the cleaned measured S-data and estimate the Vz imprint, and then subtract the estimated imprint on the measured Vz-data. The elastic model could be a very simple one, for example a water "half space" over an elastic half space, or a more complex elastic subsea model with a certain spatial distribution of elastic parameters that may be optimized in an iterative process of finding the best values for the Vz imprint calculation. The optimal model and relationship (function) between the cleaned S-data, selected gradients and the corresponding Vz-imprint could be found by optimization, comparing the S-data set with the cleaned Vz-data set, Vz_cleaned=Vz_measured-Vz_estimated, e.g. using cross-correlation and selecting the final optimal parameters as those that produce the correlation coefficients or covariance between the two data sets (<cleaned S-data and «cleaned Vz-data») closest to zero. We anticipate that, for most cases, the structural similarities of the two data sets are at a minimum (that is, they are most different) when all S-wave imprints have been removed from the Vz-data set.

From plane wave elastic theory and modeling exercises we learn that the magnitude and phase of the Vz-imprints from S-waves depend on the angle of incidence or the "apparent horizontal phase velocity" observed at the seabed. In the method mentioned above, we therefore need to include this parameter (or related expression such as angle of incidence) into the function to estimate the imprint. One method of calculating the apparent horizontal phase velocity locally from the cleaned S-wave data set (where P-waves are removed) alone would be to use the ratio between the time derivative of the horizontal particle velocity and the spatial horizontal gradient of the horizontal particle velocity (an assumption that is valid for plane wave conditions). In addition, similar calculation of the "apparent horizontal phase velocity" may be done using the recorded Vz-data (where P-waves dominate). Areas in the data domains (e.g. in time distance space) where the "apparent horizontal phase velocity" calculated from the two datasets give similar results, will indicate where S-imprint on the Vz component is dominating over the P-waves. This information could be used to better define the data space where more focus and weight should be applied. It may also be used in the optimizing process itself, helping to decide when the optimal function parameters have been found, i.e. parameters that give the lowest absolute correlation coefficients or covariance between the two data sets of "apparent horizontal phase velocity", one found from the S-data and the other found from cleaned Vz.

Another method of attenuating the S-imprints on the Vz data, which does not rely on specific elastic models, is to exploit the differences and similarities in character between the Vz- and S data sets, and attenuate the S-imprint on the Vz data solely by digital filtering. To visualize the data character, consider a modeled 2D experiment where the recorded data sets, S-waves only (Vx_diff) and P-wave (Vz with S-imprints), are plotted in a 2D data panel and where the horizontal axis represents the horizontal distance, where the sensor (or shots) are distributed, and the vertical axis represents recording time (TWT). The magnitude of the signal is normally visualized with a color according to a selected color scale, see FIG. 4 and FIG. 5. When we compare the clean S-data set (Vx-diff) with Vz data set, FIG. 5, we notice that the two images are different except from in those specific areas where we may say the S-data "imprints" the Vz-data. The task is now to search and find a digital filter that will act on the Vz data to remove the S-imprints. We propose to use the S-data set in combination with the Vz-data set to identify the areas where imprints occur and find the character of the imprints to aid the selection of a proper filter and to set the filter parameters. The criteria we use to define the optimum filter (with optimal parameters) is how well the result, the filtered Vz data, separates from the S-data set (that is the similarities in the two data sets reduces) and/or how well the residue (the difference between filtered and not-filtered Vz data set) correlates with the S-data set. The criteria may be formulated numerically by covariance and correlation expressions or just by inspection with the eye. The optimum parameters of the filter may be found by trial and error or by an iterative, automated optimization process.

One type of digital filter that may be used are "dip-filters", known in the seismic processing industry as, for example, f-k filters or tau-pi filters, or radon transform filters. These filters are designed to filter out events with certain slopes and curvatures. As mentioned earlier, physics states that the S-imprint can only occur when the apparent phase velocity is lower than a certain limit, and therefore the slope and curvature of the events to be filtered out are higher than a certain limit, a limit that may be found together with the detailed filter parameters and coefficients, described by the process above (iterative/optimization). Finally the filter is used on the Vz data, to remove/attenuate the imprints.

As mentioned earlier, the described process may also be used on the pressure data and/or x-component as well, in a similar fashion.

P Wave Data Cleaning Second Approach

An alternative approach to attenuating or removing the effects of S-P converted waves at the seabed on the individual acoustic P wave components (P, Vx, Vy, Vz)—at least those effects converted from S-waves with low apparent propagation speed at the seabed (that is S-waves hitting the seabed with a high enough incidence angle to produce a complex reflection coefficient, surface waves included)—is to transform or extrapolate the P wave and the P wave gradients (acoustic, Vx, Vy, and Vz) to a new level higher up in the water column. This is advantageous as S-P influence tends to decay quickly or even exponentially away from the seabed interface. If we can extrapolate even just a few meters higher in the water column the effects of converted S waves can be significantly reduced, whilst retaining the benefits of low noise levels existing close to the seabed.

This may be done using formulations such Taylor series expansion, where the new P wave data components at the new level are found from their "parent" components at the seabed, plus a sum of terms involving individual constants and vertical first and higher order derivatives. The constants in combination with the gradient terms may be tuned or optimized to produce a new P wave data set (including all or a selected group of its components and its gradients) with minimum S-imprint (minimum seabed S-P conversion effects).

Figure 8:
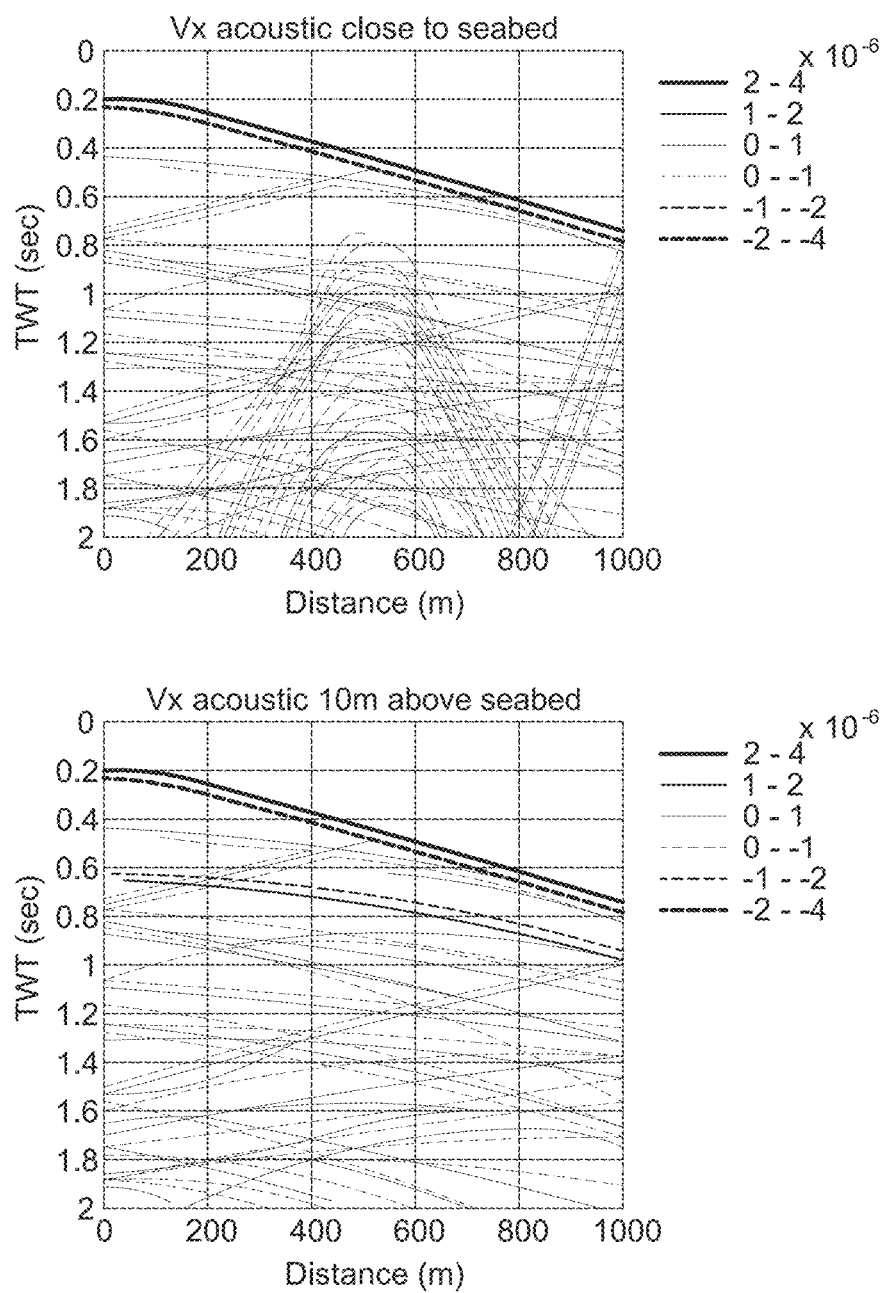
FIG. 8 shows synthetic (modeled) data for Vx acoustic, Vz acoustic, and pressure (P)
Figure 8:
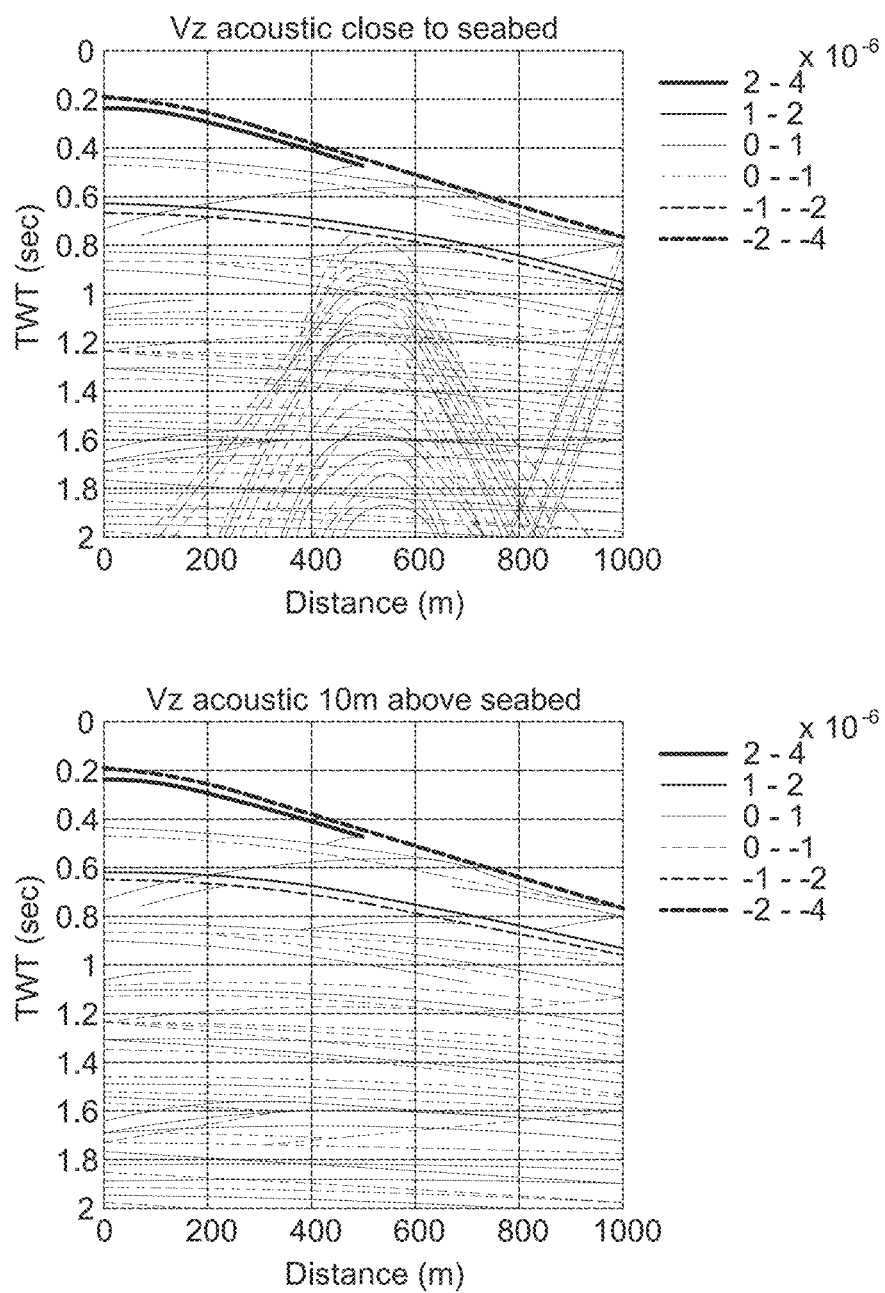
Figure 8:
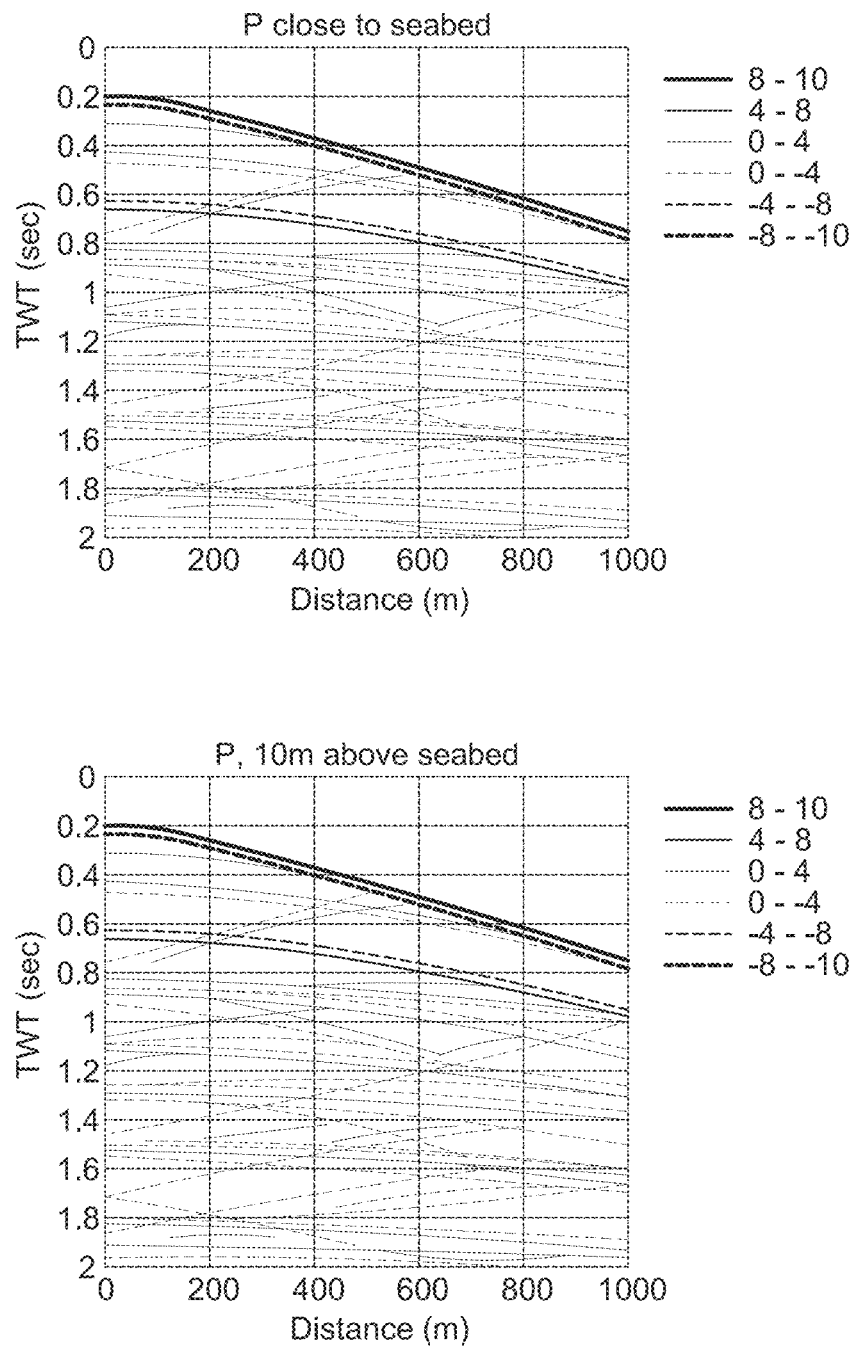

FIG. 8 shows synthetic (modeled) data for Vx acoustic, Vz acoustic, and pressure (P). The traces in the top row show the data at the seabed, whilst the traces in the bottom row show the data at a level 10 m above the seabed. We can see from this synthetic data that the S wave 'imprints' are indeed greatly reduced at a level 10 m above the seabed. It is therefore interesting to calculate the fields (P, Vx, Vy) at a higher level above the seabed, using data acquired close to the seabed, to obtain a result with attenuated S wave imprint.

In order to shift data collected at the seabed to a higher level, the following principles may be applied.

Alternative 1: Assume that we have measured the horizontal gradient (dVz/dx). Then, we may calculate Vx at a higher lever in the water colum (where s-/surface waves imprints should be less), and find an 'elevated_Vx'='seabed_Vx'+k*Vz gradient. One approach relies upon the fact that curl(v) in water is zero, that is: dVx/dz=dVz/dx. If we don't move far up in the water column, only the first two terms in the Taylor series are needed. Indeed, we do not need to move far up due to the fact that the s-/surface waves that are more horizontally inclined attenuate exponentially away from the interface. This techniques may work best in the frequency domain, as we need to move further for the low frequencies than the higher, and the approximation itself allows us to move further for the low frequencies. The approximate extrapolation distance is given by k below. An optimal value for k will probably exist as we would like to go as far as possible above the seabed but the Taylor approximation has limited extrapolation ability for few terms. Finding the elevated field for Vz follows the same principle, but now we may use the wave equation to find the derivative dVz/dz, see below.

Derivative from the curl equation) (1)

$$v_{x\_new\_altitude\_k} = v_{x(w)} + k\frac{dv_{x(w)}}{dz} + \ldots = v_{x(w)} + k\frac{dv_{z(w)}}{dx} + \ldots$$

And take derivative from the wave equation (2)

$$v_{z\_new\_altitude\_k} = v_{z(w)} + k\frac{dv_{z(w)}}{dz} + \ldots ,$$

$$\frac{d}{dx}\frac{dP}{dx} + \frac{d}{dz}\frac{dP}{dz} = \rho\left(\frac{d}{dx}a_x + \frac{d}{dz}a_z\right) = \frac{1}{V^2}\frac{d^2P}{dt^2} \quad (3))$$

$$\frac{dv_{z(w)}}{dz} = \iint_t\left(\frac{d}{dz}a_z\right) = \iint_t\left(\frac{1}{\rho V}\frac{d^2P}{dt^2} - \frac{d}{dx}a_x\right) = \frac{1}{\rho V^2}\frac{dP}{dt} - \frac{dv_x}{dx} \quad (3)*$$

An optimal value for k will also depend on how and over what distance we calculate the derivatives. Assuming that sensors with a given separation, ds, are deployed, then k=ds or ds/2 (chosen in later example) could be a good choice, but this may be frequency dependant. Possibly the spacing may be dependent upon apparent horizontal wavelength. Even better, k might be found by optimisation methods, i.e. find the k's that minimize S wave imprint. NB. from modelling results it can be seen that, for many models (with soft seabed and low angle S-waves), if we do not have measurements of $dv_x/d_x$, we may use $dv_z/dx$ instead (with 90 deg phase shift and possibly another scaling factor. Once the cleaned version of Vx and Vz are found (at a new elevation), the wave equation may be used again to find a cleaned version of P.

Figure 9:
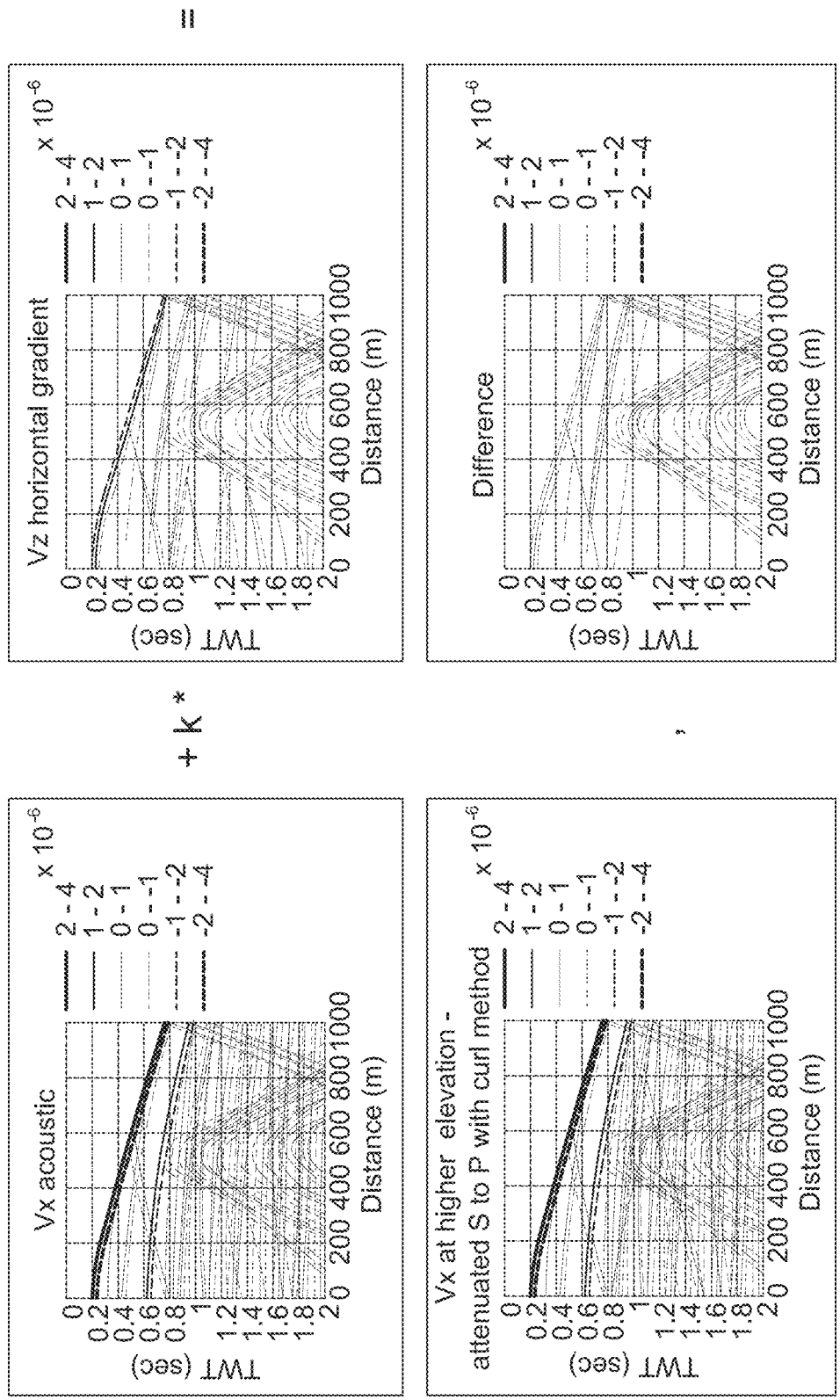
FIG. 9 illustrates in the upper left trace synthetic data for Vx acoustic, in the upper right trace synthetic data for Vz horizontal gradient at the seabed, as well as other data.

FIG. 9 illustrates in the upper left trace synthetic data for Vx acoustic (i.e. simulating data collected in the water at or very close to the seabed). The upper right trace illustrates synthetic data for Vz horizontal gradient at the seabed. The Figure illustrates that by multiplying the data in the upper right trace by a scaling factor k, and subtracting the result from the data in the upper left trace, the data shown in the bottom left trace is obtained. This result data represents Vx acoustic at a level 8 m above the seabed. The data included in the bottom right trace is the residual data removed from Vz to obtain the result data. S-imprints on Vx acoustic (using curl(v)=0) are thereby attenuated.

Figure 10:
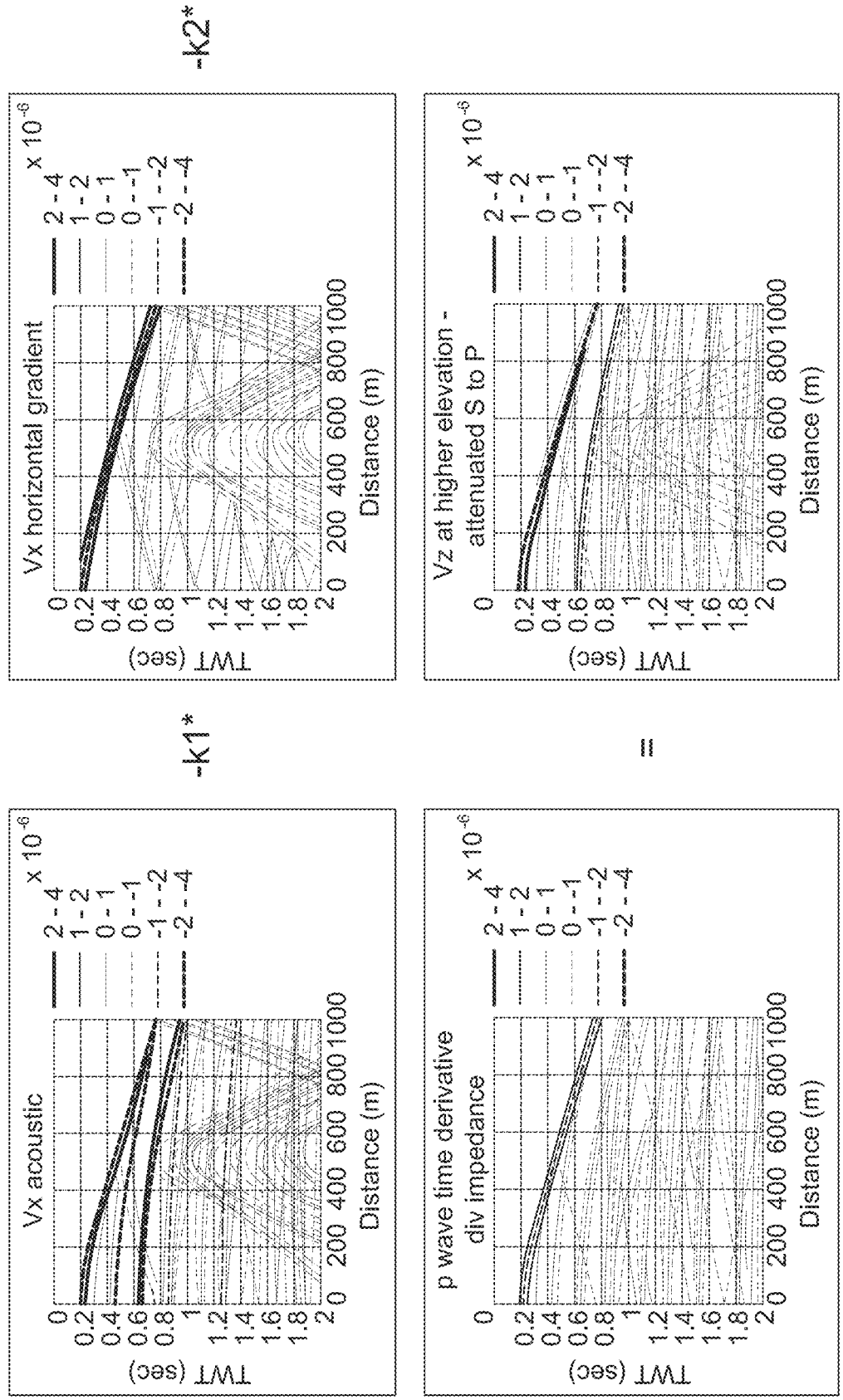
FIG. 10 illustrates a procedure for shifting Vz acoustic to a higher level above the seabed, with the result data.

The traces of FIG. 10 illustrates a procedure for shifting Vz acoustic to a higher level above the seabed, with the result data, i.e. Vz at a higher level, being shown in the bottom right trace. S-Imprints on Vz (using wave equation and dVx/dx) are attenuated.

Figure 11:
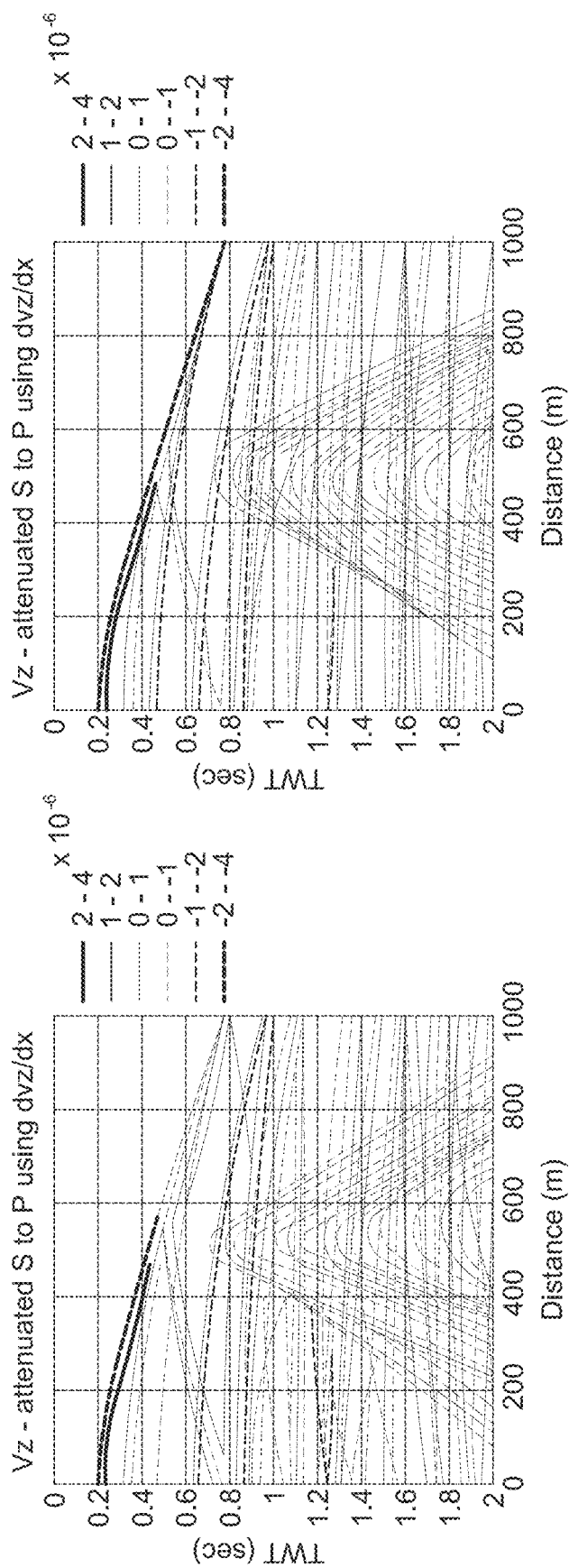
FIG. 11 illustrates simulated results for attenuated P data.
Figure 11:
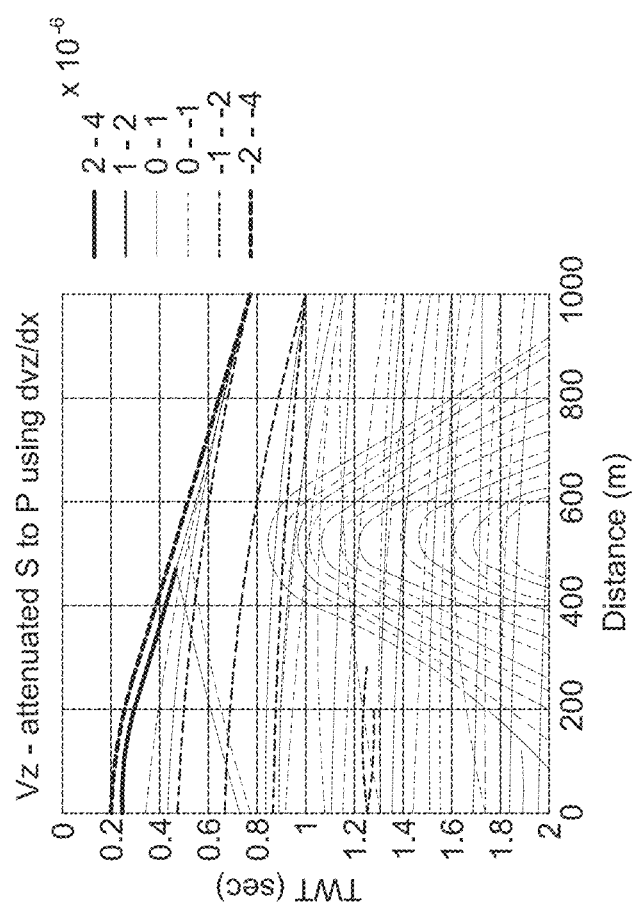

If we do not have measurements of $dv_x/dx$, we may use $dv_z/dx$ instead as shown above, to attenuate low angle S or surface waves. The idea is that, for soft sediments, the surface-waves or low angle s-reflections tend to have an eliptical or near circular retrograde motion, that is the Norm($dv_x/dx$)=Norm($dv_z/dx$), and there will be an approximate +/−90 degree phaseshift between the horizontal and vertical gradient. The sign is dependent on wave propagation direction and we therefore need to multiply with a sign-function (according to the matlab code below) of the product of the phase shifted Vz-horizontal gradients and the Vx-acoustic horizontal gradient.

wave_direction=sign(vel_x_acoustic_hor_grad
.*vel_z_acoustic_hor_grad_phase_rotated);
vel_z_higher_elevation_2=vel_z_acoustic-0.5*(p_
wave_time_derivative-
vel_z_acoustic_hor_grad_phase_rotated.*wave_
direction);

Simulated results for this approach are shown in FIG. 11.

Considering now the process of actually cleaning the pressure component of the P wave data (even if the S-imprints on pressure are not servere) using Vx and Vz near seabed, at elevation 1, and at a certain distance h above seabed, at elevation 2, this process relies upon the following:

$$\frac{dv_{z1}}{dz} + \frac{dv_{x1}}{dx} = \frac{1}{\rho V^2}\frac{dP_1}{dt} \quad (1)$$

$$\frac{dv_{z2}}{dz} + \frac{dv_{x2}}{dx} = \frac{1}{\rho V^2}\frac{dP_2}{dt} \quad (2)$$

(2)-(1) gives:

$$\frac{1}{\rho V^2}\frac{dP_2}{dt} - \frac{1}{\rho V^2}\frac{dP_1}{dt} + \left[\left(\frac{dv_{z2}}{dz} - \frac{dv_{z1}}{dz}\right) + \left(\frac{dv_{x2}}{dx} - \frac{dv_{x1}}{dx}\right)\right] \quad (3)$$

Where the following approximations may be used (or not):

$$\left[\left(\frac{dv_{z2}}{dz} - \frac{dv_{z1}}{dz}\right) + \left(\frac{dv_{x2}}{dx} - \frac{dv_{x1}}{dx}\right)\right] \approx \frac{\partial}{\partial z}\left(\frac{dv_x}{dx} + \frac{dv_x}{dz}\right) = \frac{h}{V^2}\frac{d^2v_z}{dt^2}$$

$$\frac{h}{V^2}\frac{d^2v_z}{dt^2} = \frac{h}{2V^2}\left(\frac{d^2v_{z1}}{dt^2} + \frac{d^2v_{z2}}{dt^2}\right)$$

Integrate over t once and use one of the approximations above and get:

$$P_2 = P_1 + h\frac{\rho}{2}\left(\frac{dv_{z1}}{dt} + \frac{dv_{z2}}{dt}\right) \quad (3a)$$

Or even simpler:

$$P_2 = P_1 + h\rho\left(\frac{dv_{z1}}{dt}\right) \quad (3b)$$

Figure 12:
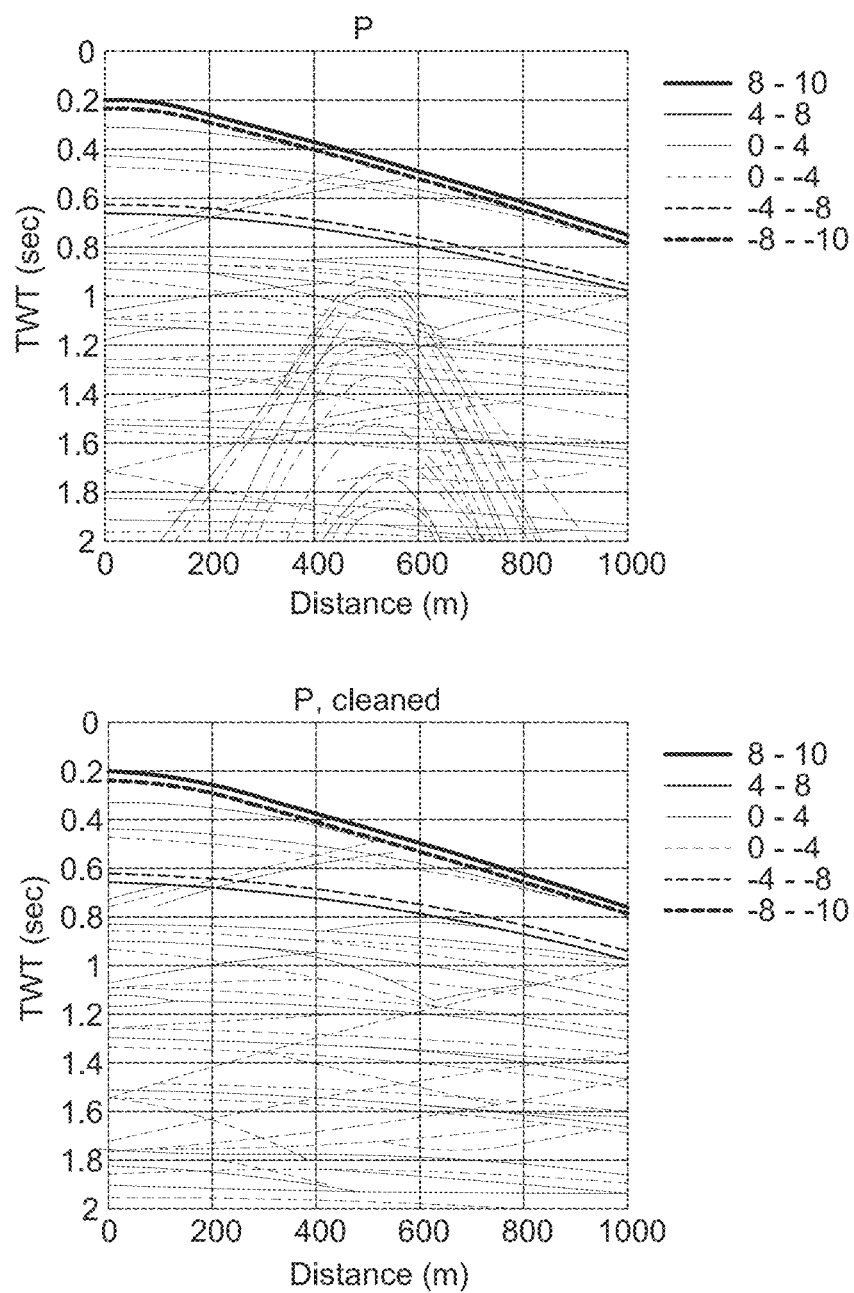
FIG. 12 illustrates modeled synthetic data and how the pressure component (input P=P1) is cleaned to remove weak S-imprints.

FIG. 12 illustrates modeled synthetic data and how the pressure component (input P=P1) is cleaned to remove weak S-imprints, (resulting in P2=P, cleaned) using eq. 3a. In this case the pressure component is not significantly affected by an S-imprint to start with, but still we can see improvements using the described method. Note that the changes would be clearer if we instead plot the spatial pressure gradients.

Alternative 2: To remove S-imprints on the P-components (in water) taking another view of using the wave equation and Taylor expansion, starting with the pressure wave field P and assuming multiple and distributed recording at several locations at/close to the seabed, P1. We then extrapolate up from level 1 at the seabed to level 2 in the water column by Taylor expansion, —i.e. find P2 (a cleaned version of P1). Then, find particle acceleration ax and az (and particle velocity Vx, and Vz) at the higher levels from the horizontal and vertical gradients of P2. Note: an estimate of the veritical gradient is (P2−P1)/level difference, and to determine ax we need to use the difference of P2 between two different x-locations: that is, we need multiple and distributed recordings having locally dense sampling in the horizontal direction. This approach relies upon the following:

Wave Equation $$\frac{d}{dx}\frac{dP}{dx} + \frac{d}{dz}\frac{dP}{dz} = \rho\left(\frac{d}{dx}a_x + \frac{d}{dz}a_z\right) = \frac{1}{V^2}\frac{d^2P}{dt^2} \quad (10)$$

$$\frac{d}{dz}a_z = \frac{1}{\rho V^2}\frac{d^2P}{dt^2} - \frac{d}{dx}a_x$$

$$P_2 = P_1 + h\rho\ a_{z1} + \frac{\rho h^2}{2}\frac{da_{z1}}{dz} + \ldots$$

$$P_2 = P_1 + h\frac{dP}{dz} + \frac{h^2}{2}\frac{d^2P}{dz^2} + \ldots$$

$$P_2 = P_1 + h\rho\ a_{z1} + \frac{\rho h^2}{2}\left(\frac{1}{\rho V^2}\frac{d^2P_1}{dt^2} - \frac{da_{x1}}{dx}\right) + \ldots$$

Then, by using P2 from (10) and taking the spatial derivative we find the particle acceleration:

$$a_{x2} = \frac{1}{\rho}\frac{dP_2}{dx}\quad a_{z2} = \frac{1}{\rho}\frac{dP_2}{dz}$$

If we need to, depending upon what data is available/recorded, and wish to focus on attenuating surface waves, the last term in (10) may be exchanged:

$$\frac{da_{x1}}{dx} \approx \text{phase shifted }\frac{da_{z1}}{dx}$$

Here we have used acceleration (ax, az) in the equations, but it could be substituted with the time derivative of particle velocity.

We see that equation (10) consist of several terms that are summed:

$$P2=P1+T1+T2+T3 \quad \text{Eq. 10:}$$

Later, we demonstrate the effect of leaving out some of these terms and how it affects the results. We observe that it might be useful to scale up or down the contribution of the different terms depending on the intended use. For example, if we like to limit the phase shift introduced on the original P-waves (to simulate a situation closer to the seabed for this part of the wave field) we may skip or scale down the T2-term.

Note that, in alternative 2, finding Vz at a higher elevation, using the wave equation there is also more than one term that may be scaled to get the desired results. As illustrated in FIG. 10 (with caption "Check, this contribution, best without") without the second term the result will be closer to what would be recorded on the seabed, without the imprint (less phase shift on the P-result).

Figure 13:
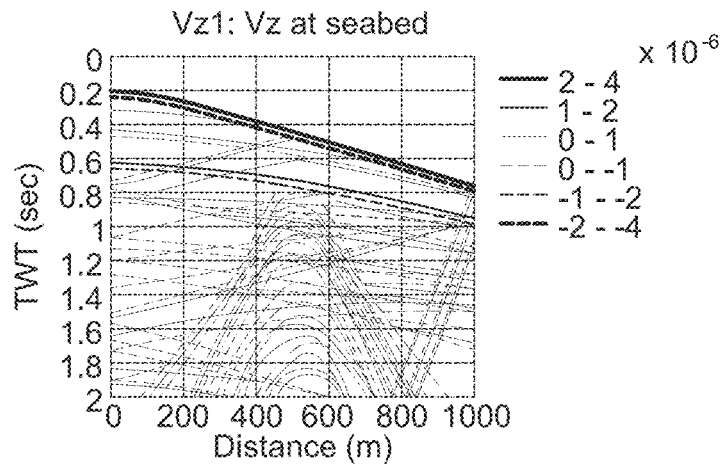
FIG. 13 illustrates a series of plots illustrating the influence on the Vz-component of the P wave data at a higher elevation, when equation terms are set to zero.
Figure 13:
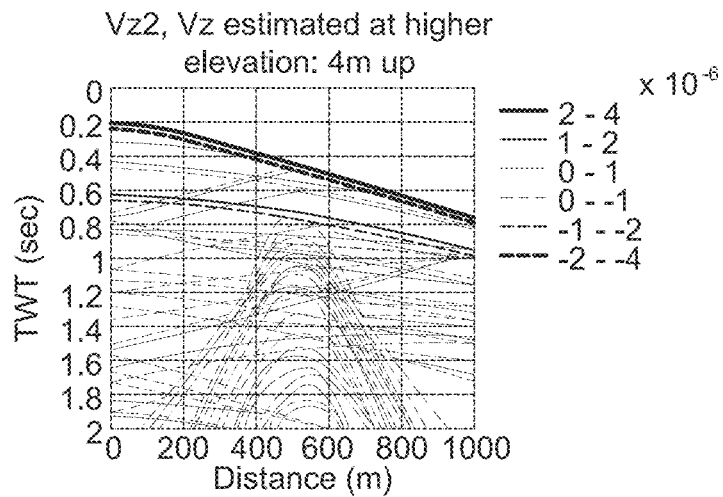
Figure 13:
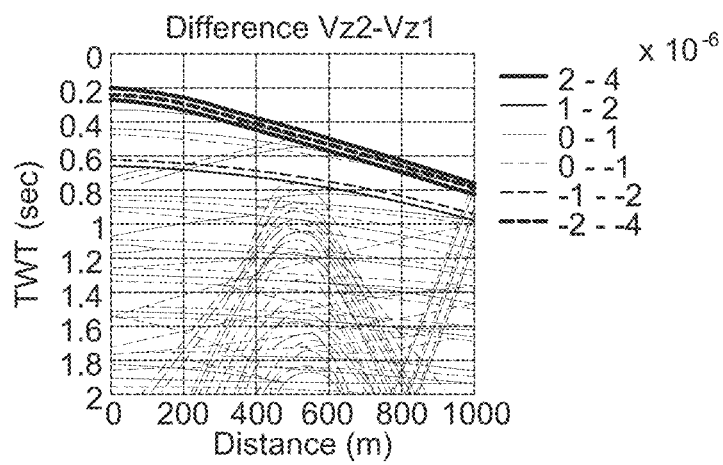
Figure 13:
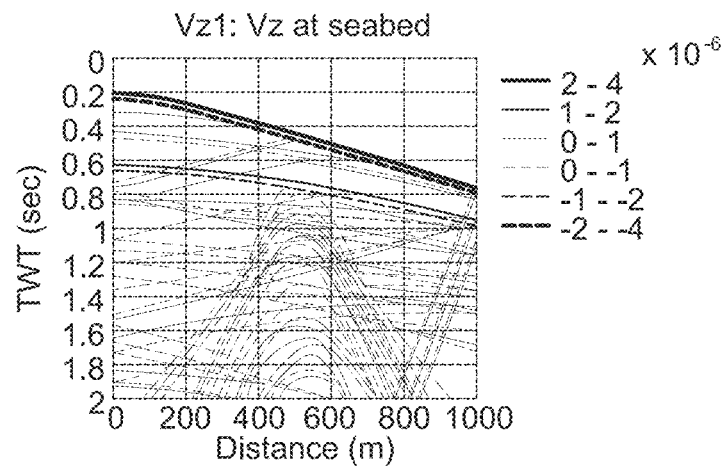
Figure 13:
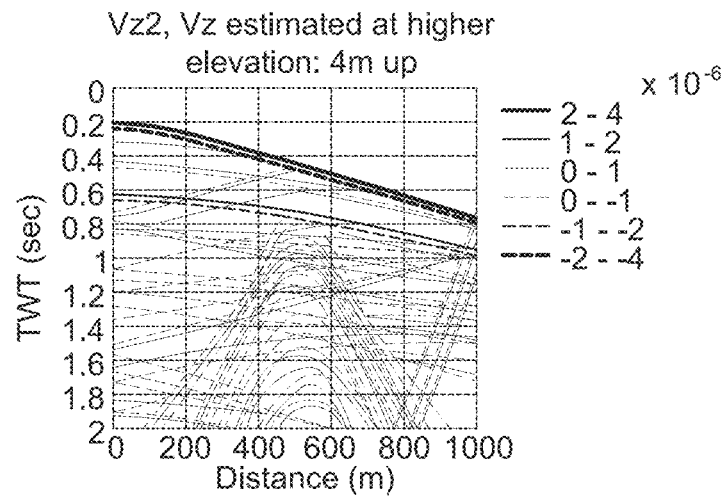
Figure 13:
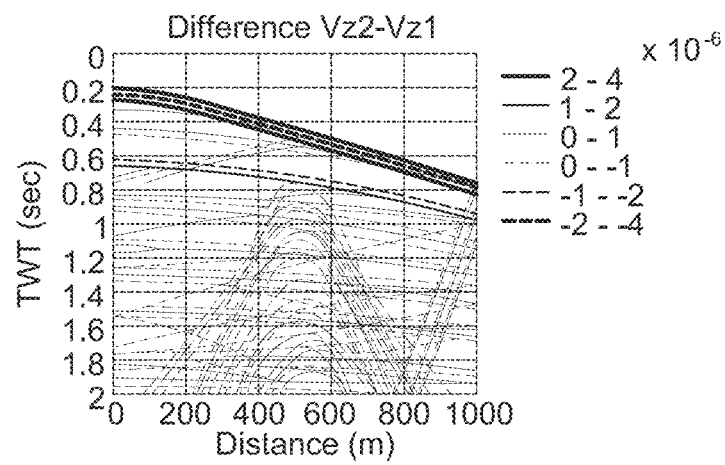
Figure 13:
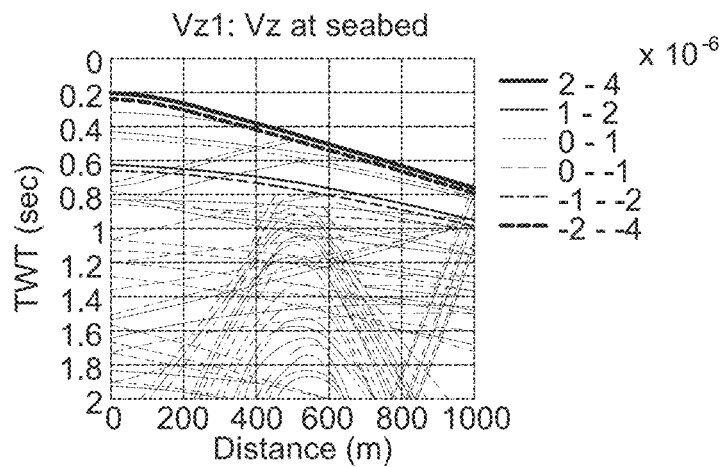
Figure 13:
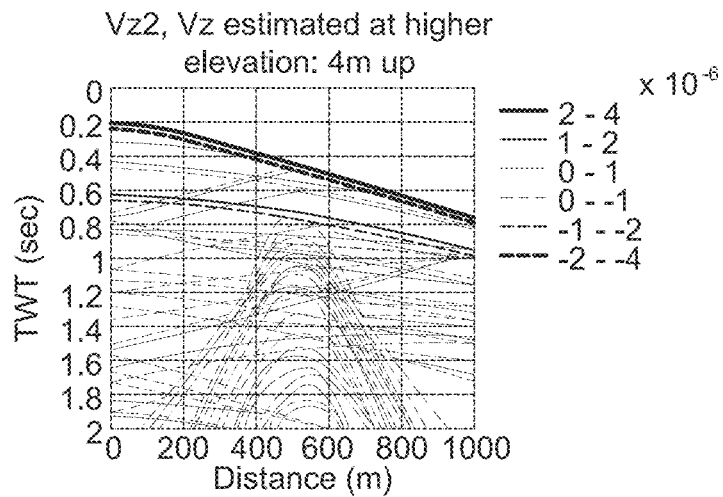
Figure 13:
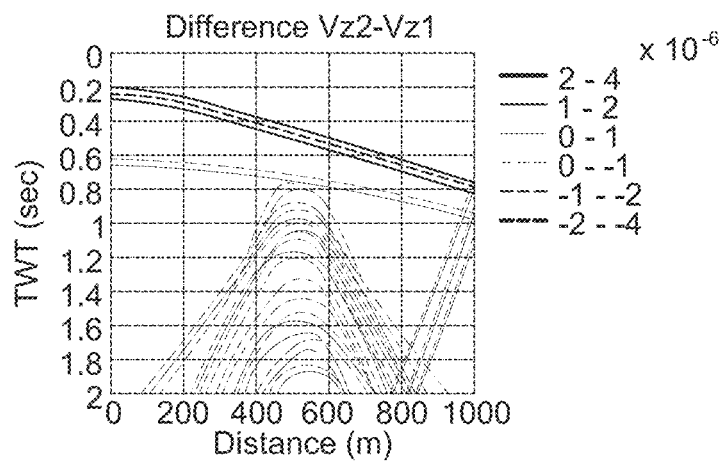
Figure 13:
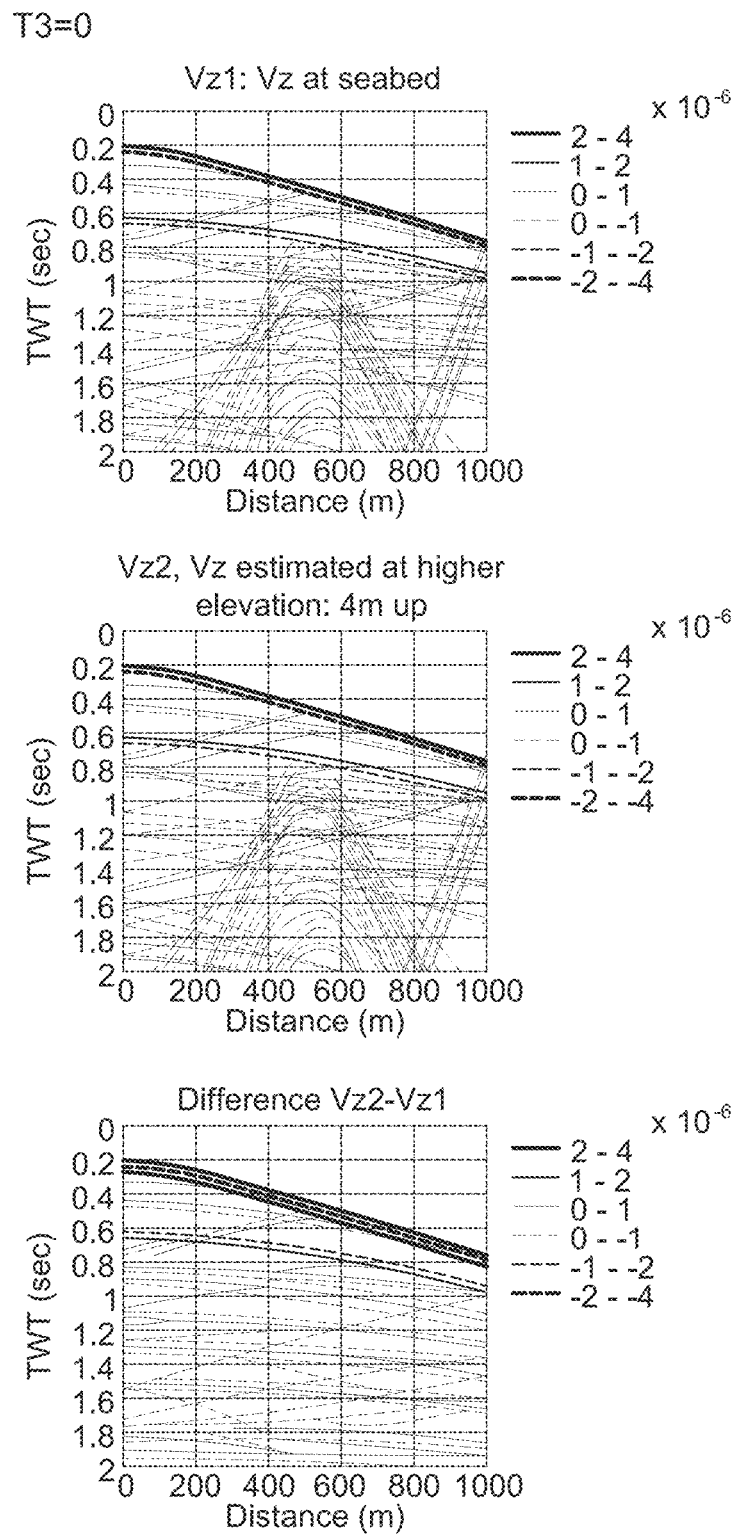
Figure 14:
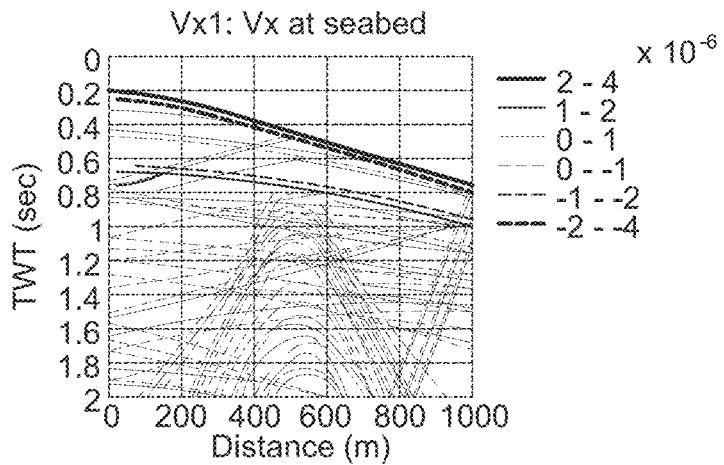
FIGS. 14 and 15 shows the same sets of plots (as FIG. 13) for Vx and Pressure (P) respectively.
Figure 14:
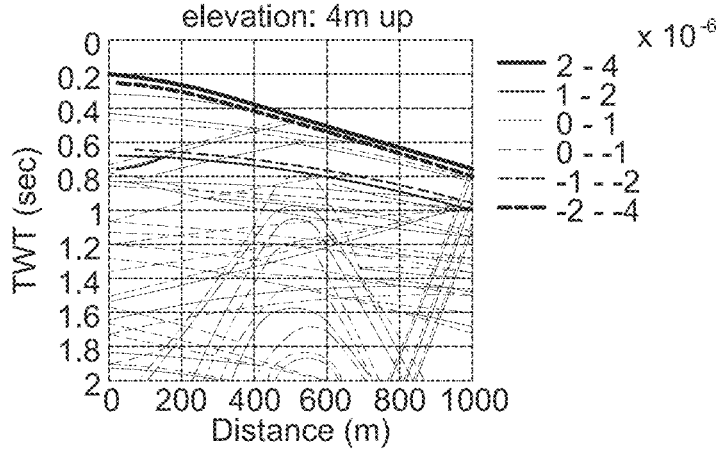
Figure 14:
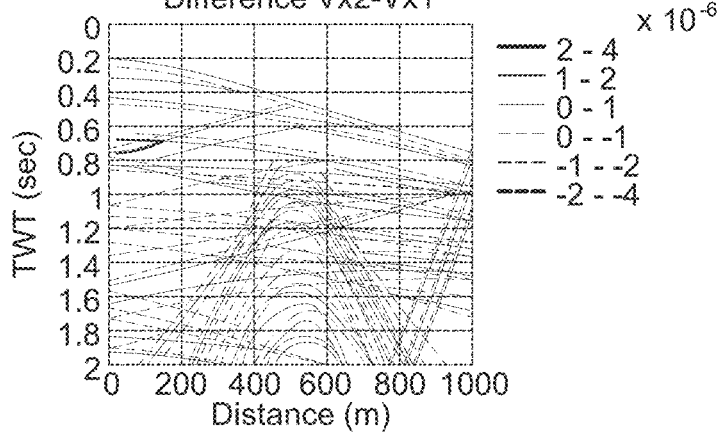
Figure 14:
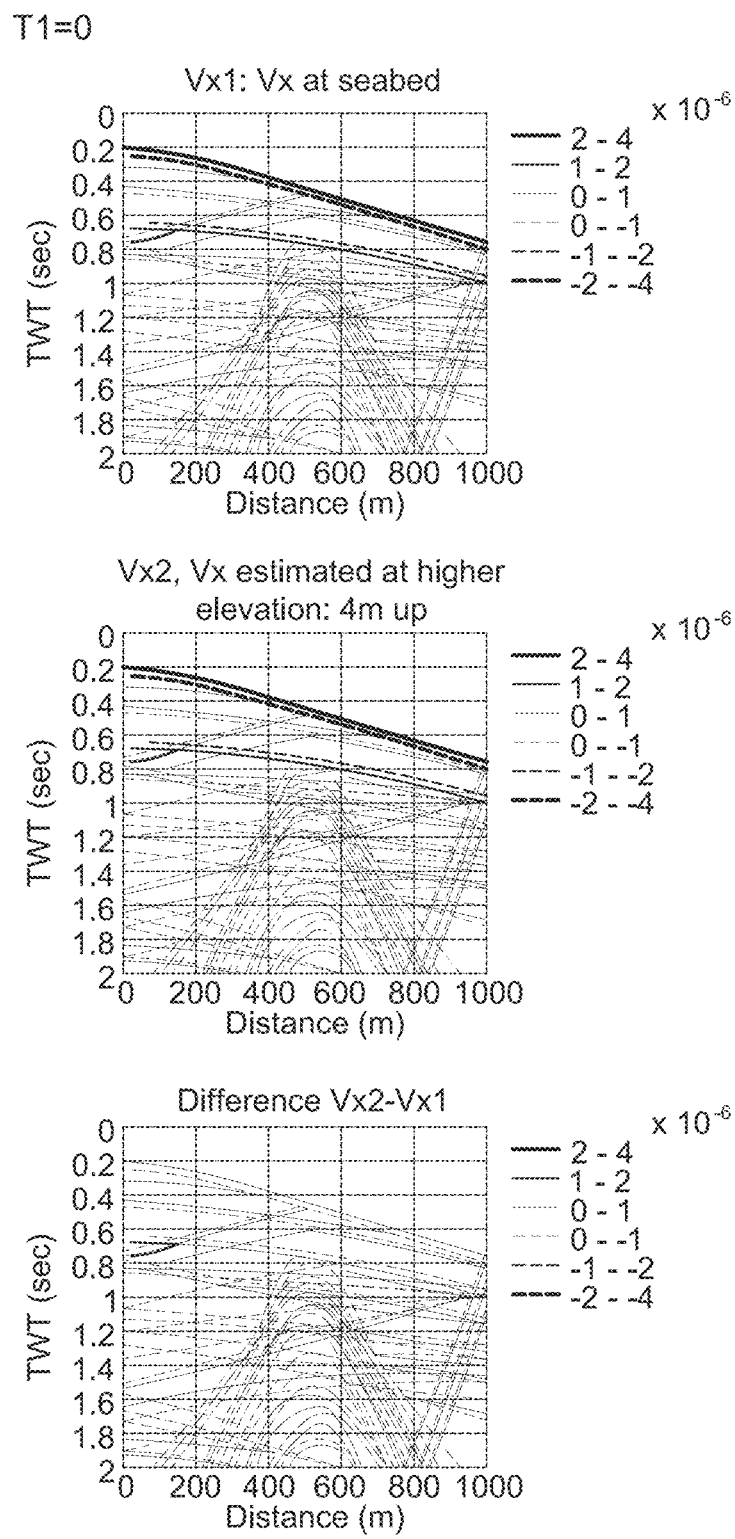
Figure 14:
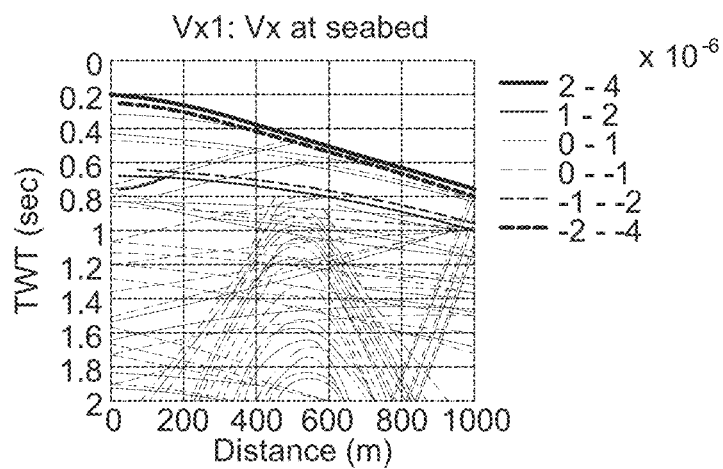
Figure 14:
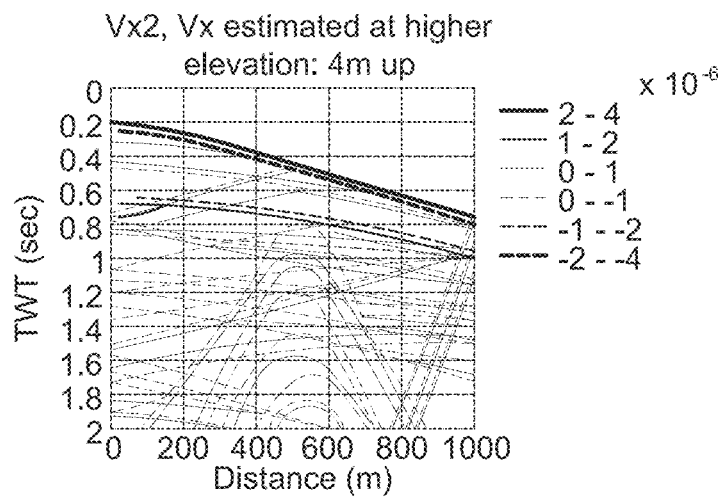
Figure 14:
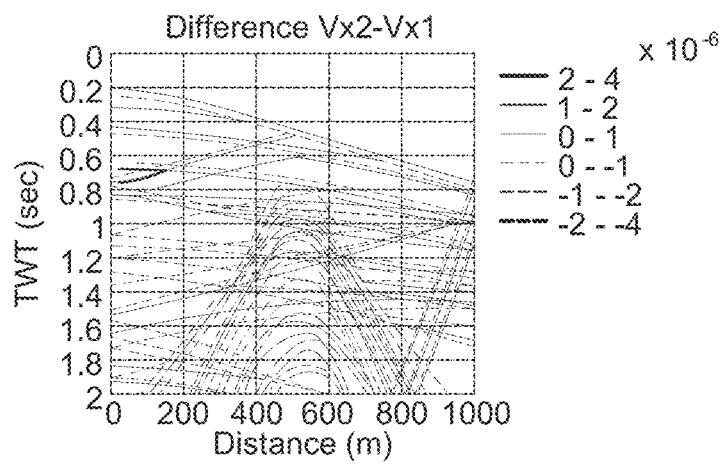
Figure 14:
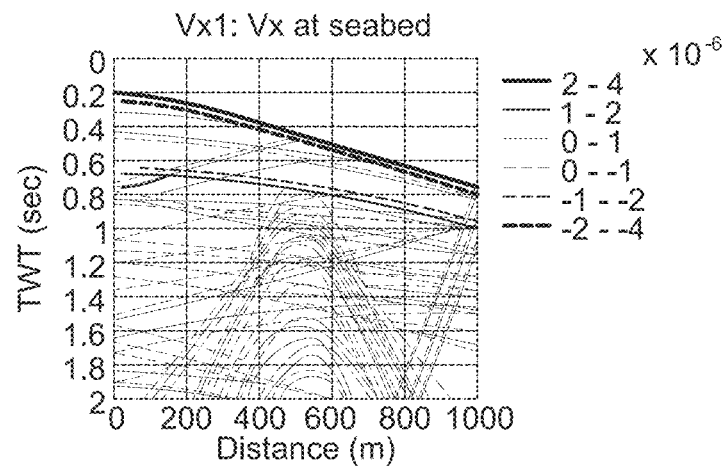
Figure 14:
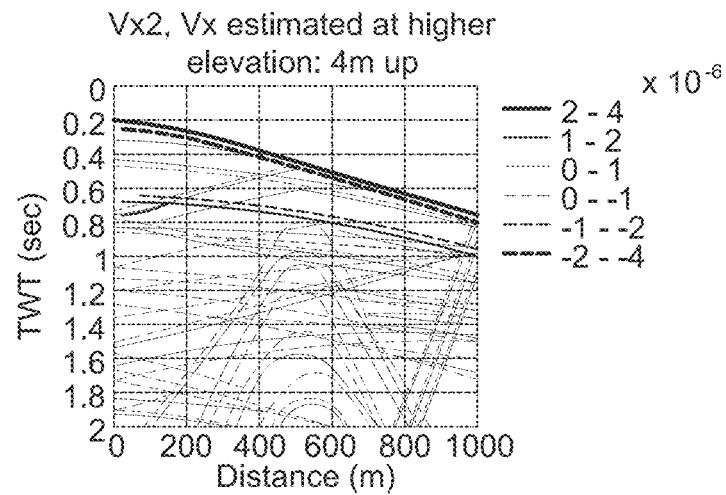
Figure 14:
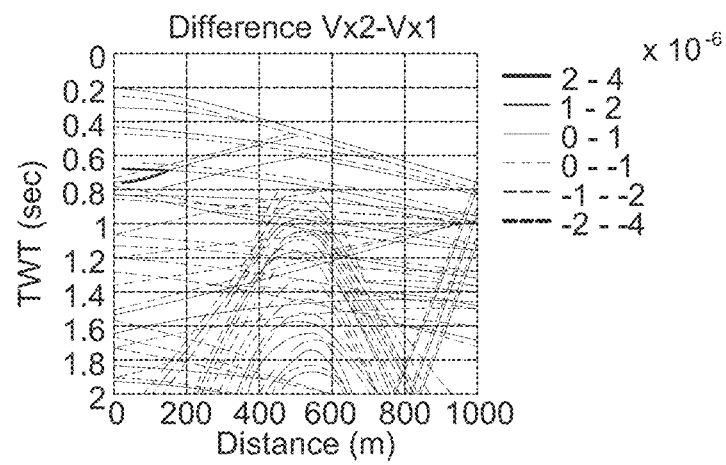
Figure 15:
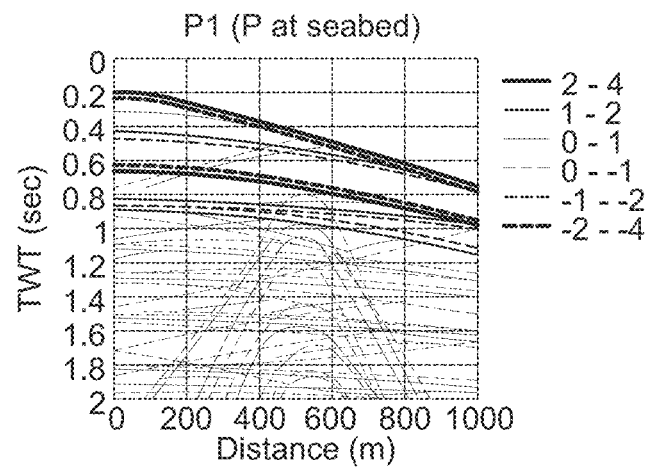
Figure 15:
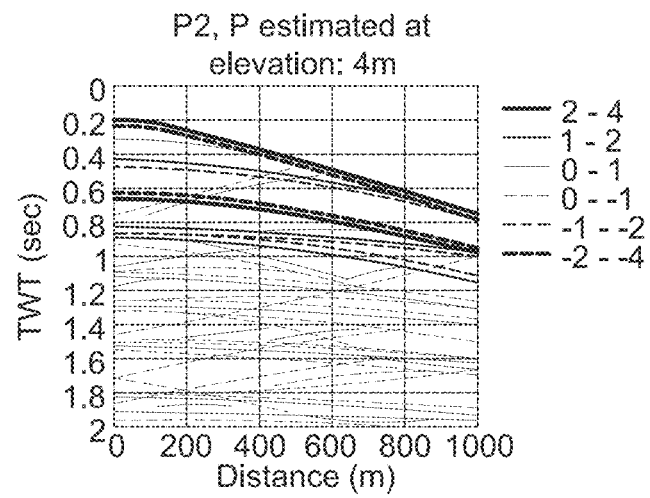
Figure 15:
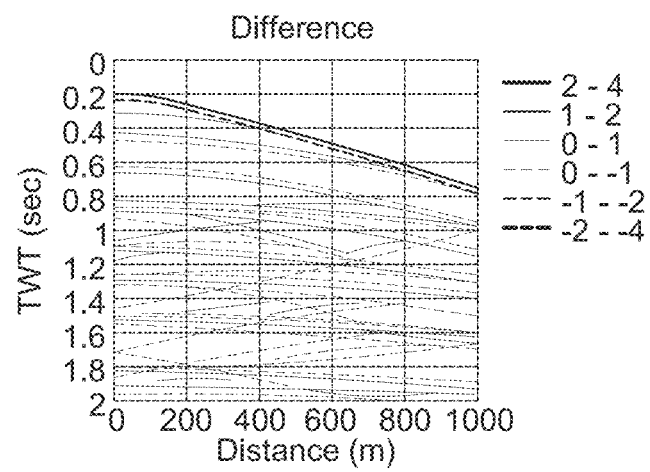
Figure 15:
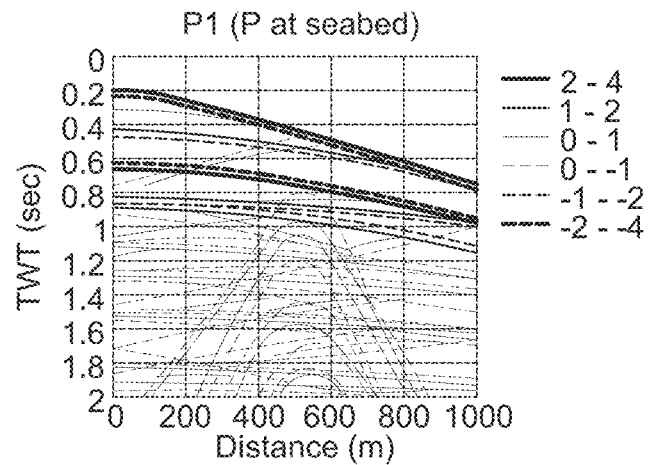
Figure 15:
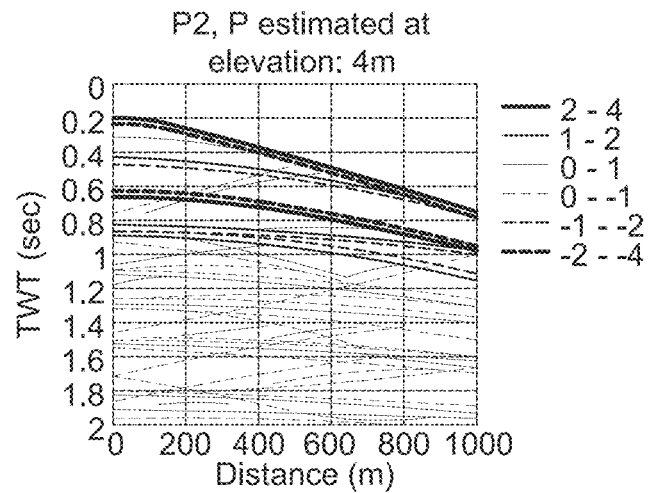
Figure 15:
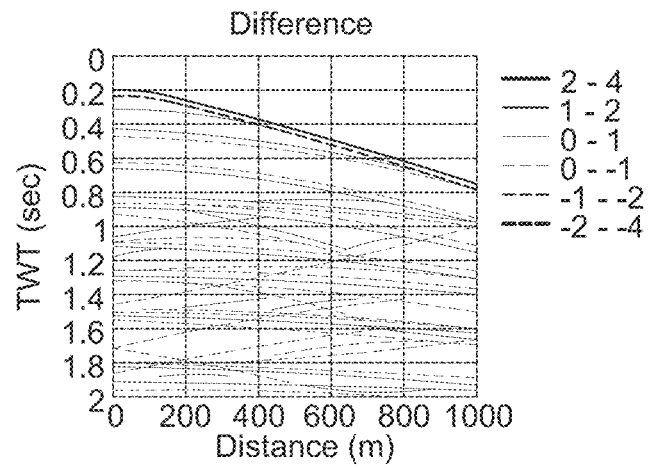
Figure 15:
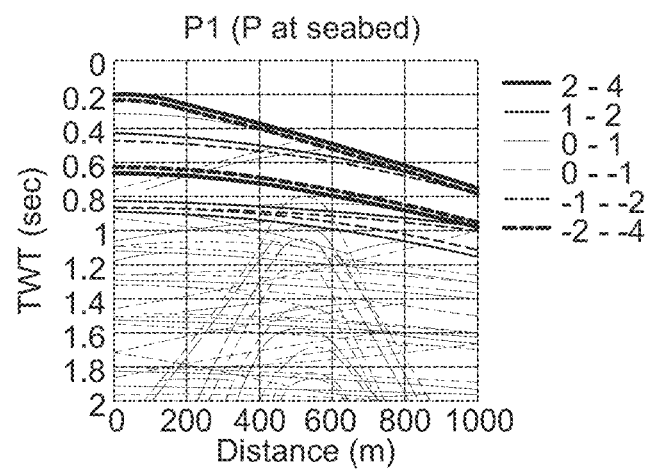
Figure 15:
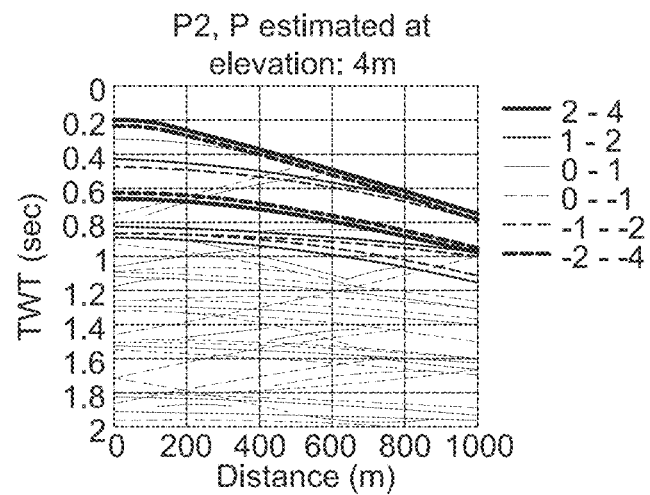
Figure 15:
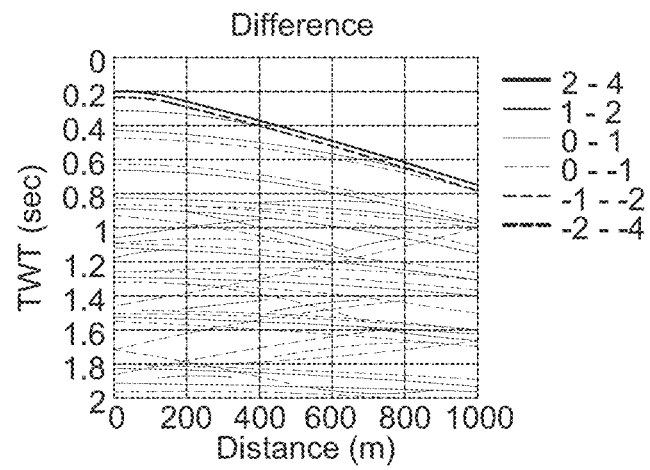
Figure 15:
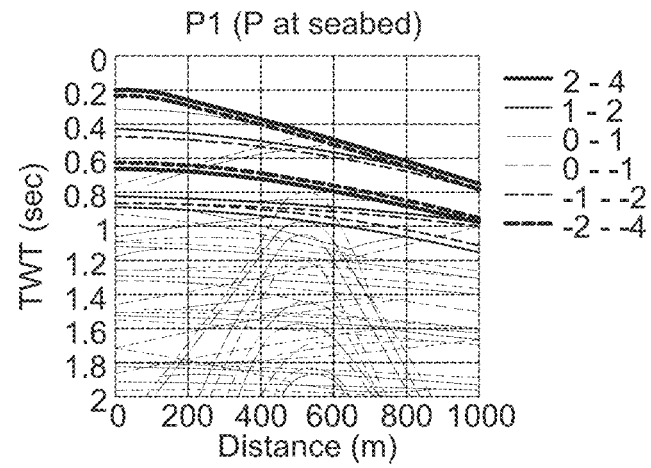
Figure 15:
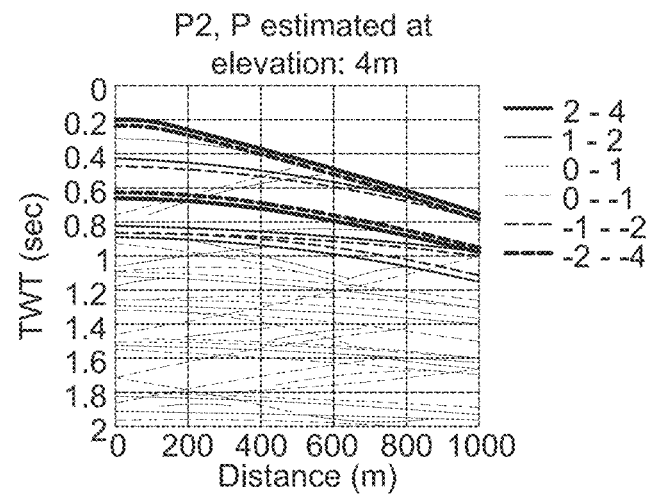
Figure 15:
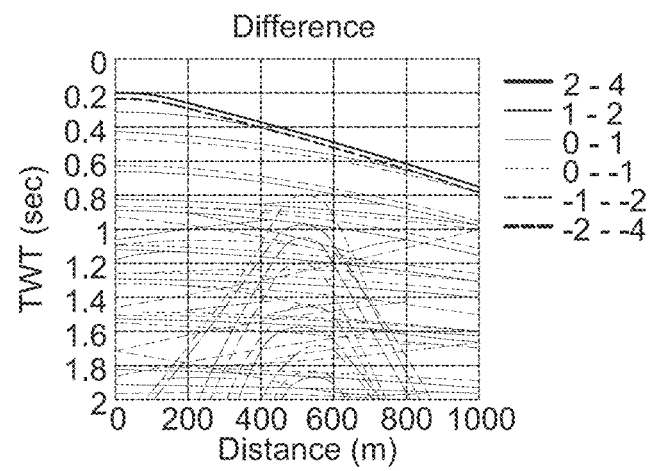

FIG. 13 illustrates a series of plots illustrating the influence on the Vz-component of the P wave data at a higher elevation (row 2) of setting the various terms (non, T1, T2, T3) of Equation 10 to zero. The top row of plots are all the same and relate to Vz at the seabed, the second row to Vz at an elevated level (4 m), and the bottom row shows the difference between the top row and the second row data. FIGS. 14 and 15 shows the same sets of plots for Vx and Pressure (P) respectively.

Further Aspects

It is possible to locally calibrate the geophones on the seabed based on the 6C measurements obtained using hydrophones. The hydrophone measurements have a better frequency response and can be used to correct magnitude and phase in the geophones. This is of particular importance for low frequencies where the response characteristic of geophones may vary considerably. For the calibration one need to use the geophone data where S-waves are removed, involving processes as indicated above or using a part of the data set where they are not present, as for example in the early arrivals from far offset sources. The calibration procedure for the horizontal geophones is then straightforward, because we may compare the geophone response with integrated scaled pressure gradient measured in the same direction. The calibration procedure of the vertical geophone probably needs to be combined also with the P wave data normalized with water or seabed impedance, and run through an optimization procedure involving so call Up-Down separation, unless the data contains single isolated events that can be used directly or in combination with the horizontal components, such as early arrival refracted waves/diving waves from far offset shots.

It is of course also possible to remove noise from single components or multicomponents in data sets like the ones described above where there may be redundant information. For example, in such a system there may be many hydrophones, and if we need only one high quality pressure recording, we may use averages or median filter to find "the best". Furthermore, the wave equations gives relationship between the time derivatives and spatial derivatives and hence measurements may be checked against these relations and anomalous measurements may be removed or corrected. In the water, the curl of the displacement (or particle velocity or acceleration) is zero, giving another relation to check the data against, or to be used in data processing.

Current seabed seismic data is typically obtained using four sensors measuring four components of the seismic wavefield at the seabed, namely pressure and three orthogonal particle displacement components or quantities derived therefrom (such as a time derivative, particle velocity, or particle acceleration). It is proposed here to use additional measurements at each seabed receiver location, (or multiple locations distributed inside a small area that is a fraction of the dominant wavelength) including at least measurements of the horizontal spatial pressure derivatives (and/or quantities derived thereof) and of the horizontal spatial derivatives of the displacement vectors (or its time derivatives) of the seabed, and to use this combined data set to enhance seismic data quality, separate elastic wave fields, and improve subsurface imaging.

One application is to exploit the diversity in this type of recorded data for single or multiple seismic shots to improve the calibration of each individual receiver component with respect to magnitude and phase and/or orientation and/or vector fidelity and/or position and/or recorder clock drift, using a specified workflow and optimization/calibration routine.

Furthermore, it is proposed to employ a method to improve the data quality (improve S/N) for key component (P, Z, X, Y) exploiting redundancy in the above mentioned measurements and key properties of the wave equation.

Furthermore, the discrete spatial sampling theorems and reciprocity principles that apply to source and receiver arrays, that include spatial gradients, may be applied in order to interpolate additional source and receiver locations. In particular, the collected cleaned S and P wave data (obtained from a given array of OBNs) may be interpolated to obtain data for virtual OBNs, thereby allowing the OBN physical grid spacing to be reduced and/or the image quality to be increased.

The invention claimed is:

1. A method for use in surveying a subsurface region beneath a body of water by detecting compressional, P, waves propagating through the body of water, the method comprising:
locating one or more sensor systems in the water at or close to the subsurface region;
using the or each sensor system to detect P waves in the water; and
translating all or a portion of the data representing the detected P waves to a higher level above the subsurface region,
wherein the effects of S waves, propagating in the subsurface and converted at the water/subsurface interface into P waves propagating in the water or along the seabed interface, in the translated data is reduced.

2. The method according to claim 1, wherein said higher level is between 1 and 50 meters above the level of the sensor system(s).

3. The method according to claim 1, wherein said higher level is between 1 and 20 meters above the level of the sensor system(s).

4. The method according to claim 1, wherein said higher level is between one tenth to two apparent horizontal wavelengths of a recorded S-wave on the seabed.

5. The method according to claim 1, wherein said sensor system is in mechanical contact with the seabed.

6. The method according to claim 1, wherein said data comprises one or more of pressure, pressure gradients, vertical particle velocity (Vz), horizontal particle velocity (Vx and/or Vy), vertical particle acceleration, and horizontal particle acceleration.

7. The method according to claim 6, wherein a data component at a higher level is obtained using a corresponding component, detected at or close to the subsurface region by said sensor system, and a first order derivative of the detected component.

8. The method according to claim 7, wherein a data component at a higher level is obtained additionally using one or more higher order derivatives of the detected component.

9. The method according to claim 8, wherein said data component at a higher level is obtained by applying a Taylor series expansion using a finite and selected number of terms in said expansion.

10. A method for use in surveying a subsurface region beneath a body of water by detecting compressional, P, waves propagating through the body of water, the method comprising:
locating one or more sensor systems in the water at or close to the subsurface region;
using the or each sensor system to detect P wave data in the water, including at least pressure and pressure gradients or components derived therefrom;
translating the P wave data using a combination of pressure, a second order time derivative of pressure, vertical pressure gradient, and second order horizontal pressure gradient or components derived therefrom; and
taking spatial derivatives of the translated P wave data to determine particle acceleration or particle velocity data, wherein the effects of S waves, propagating in the subsurface and converted at the water/subsurface interface into P waves propagating in the water or along the seabed interface, in determined particle acceleration data is reduced.

11. A method for use in surveying a subsurface region beneath a body of water by detecting compressional, P, waves propagating through the body of water, the method comprising:
locating one or more sensor systems in the water at or close to the subsurface region;
using the or each sensor system to detect P wave data in the water, including at least pressure and the horizontal pressure gradient, or the horizontal particle velocity or acceleration and the horizontal gradient of the vertical particle velocity or acceleration; and
translating the horizontal particle velocity or acceleration of the P wave data using a combination of the horizontal particle velocity (or acceleration) and the horizontal derivatives of the vertical particle velocity or acceleration,
wherein the effects of S waves, propagating in the subsurface and converted at the water/subsurface interface into P waves propagating in the water or along the seabed interface, in the translated horizontal particle velocity or acceleration is reduced.

12. A method for use in surveying a subsurface region beneath a body of water by detecting compressional, P, waves propagating through the body of water, the method comprising:
locating one or more sensor systems in the water at or close to the subsurface region;
using the or each sensor system to detect P wave data in the water, including at least pressure and pressure gradients or components derived thereof; and
translating the vertical particle velocity or acceleration of the P wave data using a combination of the vertical particle velocity or acceleration, the time derivative of pressure, and the horizontal derivative of either the horizontal particle velocity or acceleration or the vertical particle velocity or acceleration,
wherein the effects of S waves, propagating in the subsurface and converted at the water/subsurface interface into P waves propagating in the water or along the seabed interface, in the translated vertical particle velocity or acceleration is reduced.

13. A method of mapping or imaging a subsurface region beneath a body of water, comprising:
the method of claim 1;
detecting the S waves; and
creating a map or image of the subsurface region according to a combination of P and S wave responses.

14. The method according to claim 13, further comprising the step of providing an improved estimate of location, size and volume prediction, and types of fluids present in the subsurface region according to the created map or image of the subsurface region.

15. The method according to claim 1, wherein said translating is performed using the acoustic wave equation.

16. The method according to claim 1, wherein the data representing the detected P waves, and the effects of the S waves, obey the acoustic wave equation.

17. The method according to claim 10, wherein said translating is performed using the acoustic wave equation.

18. The method according to claim 10, wherein the P wave data, and the effects of the S waves, obey the acoustic wave equation.

19. The method according to claim 11, wherein said translating is performed using the acoustic wave equation.

20. The method according to claim 11, wherein the P wave data, and the effects of the S waves, obey the acoustic wave equation.

21. The method according to claim 12, wherein said translating is performed using the acoustic wave equation.

22. The method according to claim 12, wherein the P wave data, and the effects of the S waves, obey the acoustic wave equation.

* * * * *